US012220807B2

(12) United States Patent
Nakajima et al.

(10) Patent No.: US 12,220,807 B2
(45) Date of Patent: Feb. 11, 2025

(54) HANDHELD DEVICE AND HOLDER

(71) Applicant: IDEC CORPORATION, Osaka (JP)

(72) Inventors: Koichi Nakajima, Osaka (JP); Kenichi Yasukawa, Osaka (JP); Souhei Okamoto, Osaka (JP); Momomi Oishi, Osaka (JP); Shigetoshi Fujitani, Osaka (JP)

(73) Assignee: IDEC CORPORATION, Osaka (JP)

( * ) Notice: Subject to any disclaimer, the term of this patent is extended or adjusted under 35 U.S.C. 154(b) by 0 days.

(21) Appl. No.: 17/776,264

(22) PCT Filed: Nov. 11, 2020

(86) PCT No.: PCT/JP2020/042023
§ 371 (c)(1),
(2) Date: May 12, 2022

(87) PCT Pub. No.: WO2021/100567
PCT Pub. Date: May 27, 2021

(65) Prior Publication Data
US 2022/0388177 A1    Dec. 8, 2022

(30) Foreign Application Priority Data

Nov. 19, 2019   (JP) ................................ 2019-209149
Nov. 7, 2020   (JP) ................................ 2020-186218

(51) Int. Cl.
*A45F 5/10*      (2006.01)
*B25J 9/16*      (2006.01)
*B25J 13/02*      (2006.01)

(52) U.S. Cl.
CPC .............. *B25J 13/02* (2013.01); *A45F 5/10* (2013.01); *B25J 9/1656* (2013.01); *A45F 2200/0516* (2013.01); *A45F 2200/0525* (2013.01)

(58) Field of Classification Search
CPC .............. A45F 5/10; A45F 2200/0525; A45F 2200/0516; A45F 2200/0508; H04B 2001/3861; B62J 13/02; B62J 9/1656
(Continued)

(56) References Cited

U.S. PATENT DOCUMENTS 5,457,745 A * 10/1995   Wang .................. B60R 11/0241
                                                   379/426
6,697,681 B1   2/2004   Stoddard et al.
(Continued)

FOREIGN PATENT DOCUMENTS

DE    102010025751 A1   1/2011
EP    3081347 A2   10/2016
(Continued)

OTHER PUBLICATIONS

JP 4391436 with Translation (Year: 2012).*
(Continued)

*Primary Examiner* — Adam J Waggenspack
(74) *Attorney, Agent, or Firm* — CANTOR COLBURN LLP

(57) ABSTRACT

The handheld device improves an operability. The handheld device 1 includes a tablet 2 provided on the front side of the device 1 and a grip part 3 provided on the backside of the device 1 and to be griped by the operator H. The grip part 3 is rotatable relative to the tablet 2.

10 Claims, 46 Drawing Sheets

(58) Field of Classification Search
USPC .................................................. 224/217–218
See application file for complete search history.

(56) References Cited

U.S. PATENT DOCUMENTS

| | | | |
|---|---|---|---|
| 6,708,887 B1 | 3/2004 | Garrett et al. | |
| 8,939,482 B2 * | 1/2015 | Rasmussen | A45F 5/00 294/25 |
| 9,103,492 B2 * | 8/2015 | Springer | F16M 13/022 |
| 9,388,939 B2 * | 7/2016 | Girault | F16M 11/105 |
| 10,201,221 B1 * | 2/2019 | Chang | A45F 5/10 |
| 2003/0234170 A1 | 12/2003 | Wecke et al. | |
| 2005/0141681 A1 | 6/2005 | Graiger | |
| 2011/0273820 A1 * | 11/2011 | Temiz | G11B 33/025 361/679.01 |
| 2012/0068043 A1 * | 3/2012 | Daigle | G06F 1/1628 248/682 |
| 2012/0075799 A1 * | 3/2012 | Pollex | G06F 1/1626 361/679.56 |
| 2012/0170211 A1 | 7/2012 | Waller | |
| 2013/0307799 A1 | 11/2013 | Hauf | |
| 2016/0297067 A1 * | 10/2016 | Kogan | B25J 13/06 |
| 2019/0199386 A1 | 6/2019 | Balmer | |

FOREIGN PATENT DOCUMENTS

| | | |
|---|---|---|
| JP | 11119822 A | 4/1999 |
| JP | 2002352652 A | 12/2002 |
| JP | 2004355195 A | 12/2004 |
| JP | 4391436 B2 * | 12/2009 |
| JP | 2011104760 A | 6/2011 |
| JP | 2015232804 A | 12/2015 |
| JP | 2016060018 A | 4/2016 |
| JP | 2016221644 A | 12/2016 |
| JP | 2017202550 A | 11/2017 |
| JP | 202049643 A | 4/2020 |
| JP | 202111002 A | 2/2021 |

OTHER PUBLICATIONS

International Search Report PCT/JP2020/042023 filed Nov. 11, 2020; Mail date Jan. 26, 2021.
International Preliminary Report on Patentability for corresponding application PCT/JP2020/042023 filed Nov. 11, 2020; Mail date Jun. 2, 2022.
International Preliminary Report on Patentability for corresponding application PCT/JP2020042023 filed Nov. 11, 2020, Report dated May 17, 2022.

* cited by examiner

HANDHELD DEVICE AND HOLDER

TECHNICAL FIELD

The present invention relates generally to a handheld device and a holder.

BACKGROUND ART

Japanese patent No. 6565151 discloses an operating device for outputting an actuating signal to an industrial robot that includes an operation terminal such as a smartphone and a grip part provided upright on the backside of the operation terminal for a worker to grip (see paragraphs [0055] to [0059] and FIG. 6 of the above JP patent). According to the above JP patent, it is described that the operation terminal can be held easily and securely by gripping the grip part with one hand of the worker and that a touch operation of the operation terminal can be readily performed by operating the operation terminal with the other hand of the worker.

PRIOR ART REFERENCES

Patent Documents

Patent Document 1: Japanese patent No. 6565151 (see paragraphs [0055] to [0059] and FIG. 6).

SUMMARY OF THE INVENTION

Objects to be Achieved by the Invention

However, in the above-mentioned prior-art device, since the grip part is fixed to the backside of the operation terminal (see paragraph [0055] and FIG. 6), when the worker grips the grip part, the orientation of the operation terminal is restricted to a constant direction (e.g. longitudinal orientation). On the other hand, there are cases in which the worker wants to change the orientation of the operation terminal into a different orientation (e.g. sideways orientation) in terms of visibility of the operation screen and good operability. In the above-mentioned prior-art device, since the position of the grip part is fixed, the device cannot correspond to such a change of the orientation of the operation terminal. Therefore, the prior-art device does not have a high operability. Hypothetically speaking, if the worker changes the grip position of the grip part to cause the device to correspond to the change of the orientation of the operation terminal, an enable switch and an emergency stop switch are disposed at a hard-to-operate position for the worker, thereby lowering the operability.

The present invention has been made in view of these circumstances and its object is to provide a handheld device and a holder that can improve operability.

Means of Achieving the Objects

A handheld device according to the present invention comprises a body provided on a front side of the device and a grip part provided on a backside of the device and to be gripped by a person to grip. The grip part is rotatable relative to the body.

According to the present invention, since the grip part is provided rotatably relative to the body of the device, the person can rotate the body relative to the grip part with the grip part gripped by the person, such that thereby the rotational position of the body relative to the grip part, that is, the orientation of the body, can be changed. As a result, operability of the device can be improved.

The grip part may have a spherical shape, preferably, a flat spherical shape. Here, in the specification of the present application, the term "spherical shape" includes not only a sphere or a spherical body but also a substantial sphere or a substantial spherical body, a deformed sphere or a deformed spherical body, a polyhedron shape and the like. Therefore, in the specification of the present application, the term "flat spherical shape" includes not only a flat sphere or a flat spherical body but also a flat substantial sphere or a flat substantial spherical body, a flat deformed sphere or a flat deformed spherical body, a flat polyhedron shape and the like, and also includes an oblate shape and oblate ellipsoid. In addition, the polyhedron shape may be a convex one or a concave one.

At least a bottom portion of the grip part may be sized to fit in a palm of the person's hand.

The grip part may be disposed at the center of the device.

The rotational axis of the grip part may pass through the center or the vicinity of the center of the device.

The device may further comprise a holder part that includes an engagement portion to detachably engage with the body. The grip part may be rotatably supported at the backside surface of the holder part.

The body may be provided with a detachable operation input part for accepting an input operation by the person.

The operation input part may include an attaching portion that is attached to the body absorbably, adhesively, or clippably.

A holder with an engagement portion for detachably engaging with a handheld device according to the present invention may comprise a grip part provided on the backside of the holder and gripped by a person to grip. The grip part may be supported at the backside surface of the holder such that the grip part is rotatable relative to the handheld device. In addition, the term "handheld device" of the invention corresponds to term "body" of the above-mentioned respective inventions. Therefore, the constitution including "handheld device" and "grip portion" of the invention corresponds to "handheld device" of the above-mentioned respective inventions.

The handheld device may be provided with a detachable operation input part for accepting an input operation by the person.

The operation input part may include an attaching portion that is attached to the handheld device absorbably, adhesively, or clippably.

Effects of the Invention

As mentioned above, according to the handheld device and the holder of the present invention, operability can be improved.

BEST MODE FOR CARRYING OUT THE INVENTION

Embodiments of the present invention will be described below with reference to the accompanying drawings.

Figure 11:
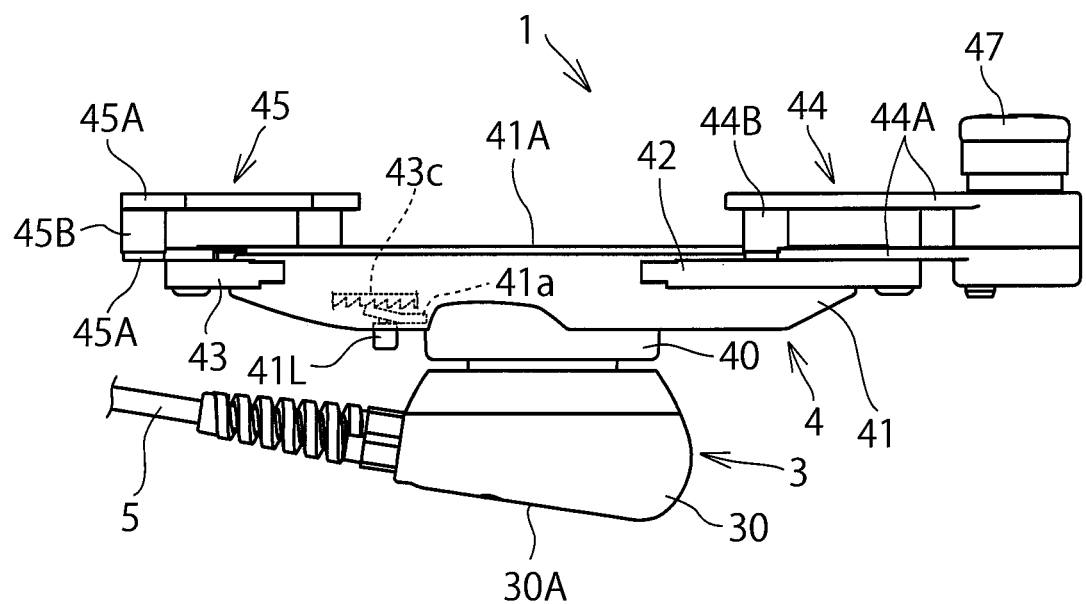
FIG. 11 is a view as viewed from the arrow XI of FIG. 8.
Figure 12:
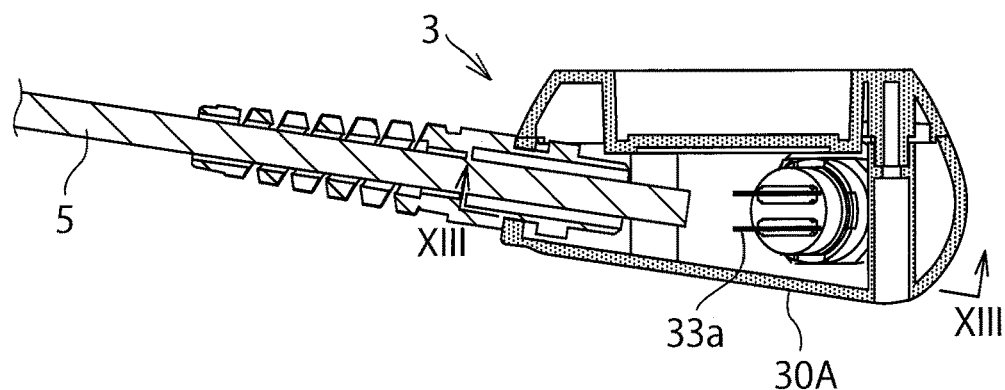
FIG. 12 is a sectional view of FIG. 9 taken along line XII-XII, illustrating a schematic longitudinal section of the grip part.
Figure 12A:
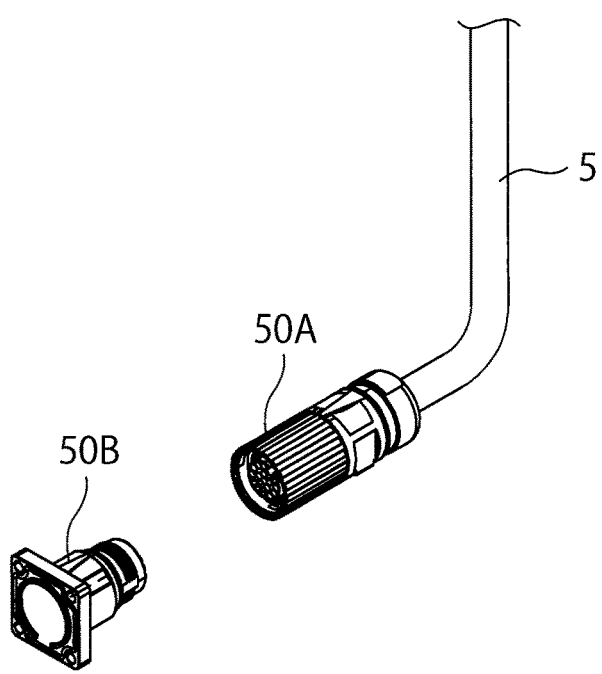
FIG. 12A is a perspective view of a connector part provide at a cable of the handheld device of FIG. 1.
Figure 13:
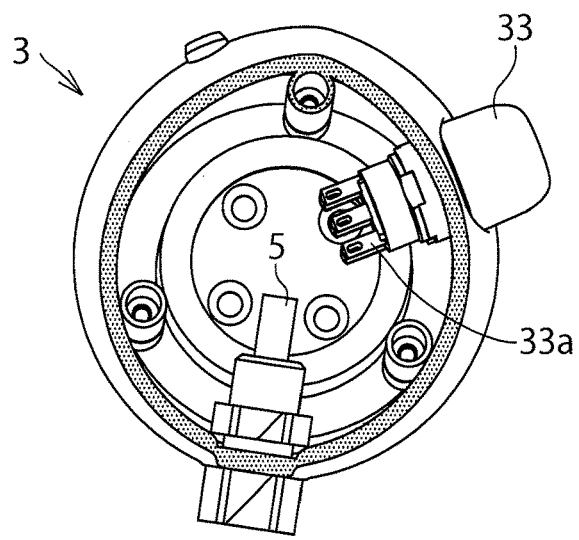
FIG. 13 is a sectional view of FIG. 12 taken along line XIII-XIII, illustrating a schematic cross section of the grip part.
Figure 14:
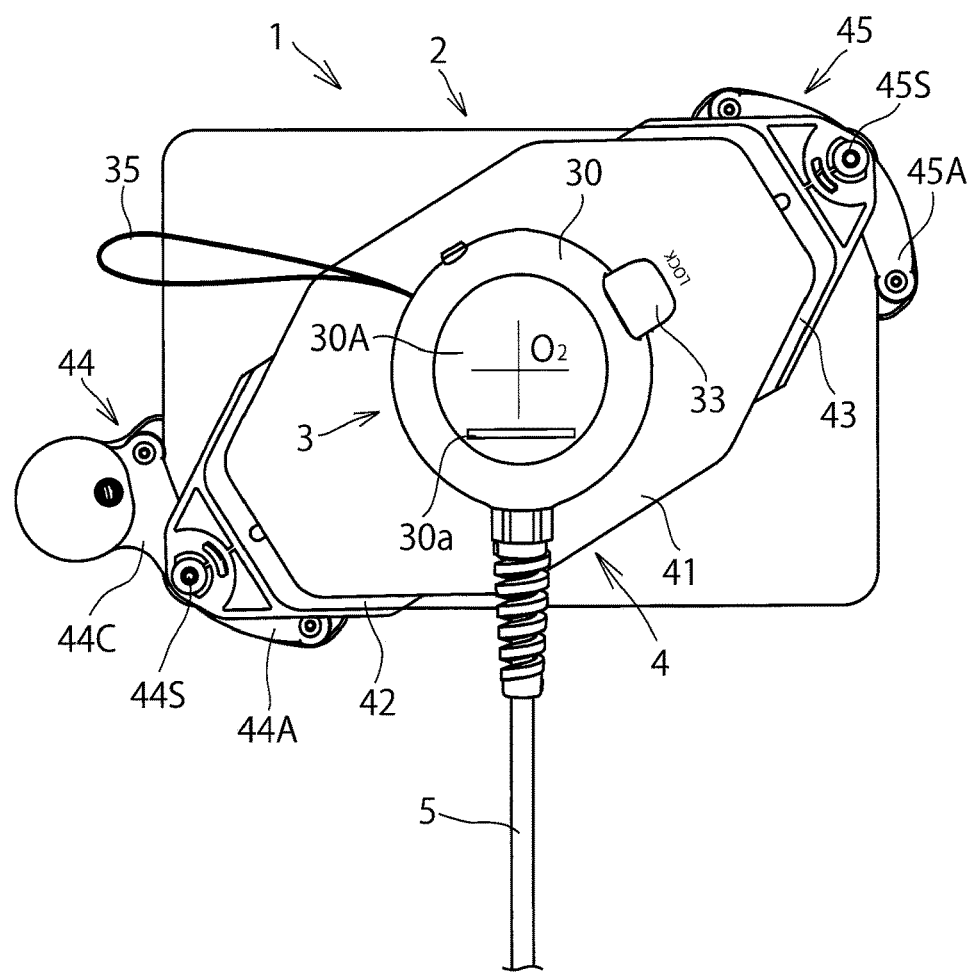
FIG. 14 is a back side or back elevational view of the handheld device in the state where the tablet is rotated by 90 degrees from the state of FIG. 4.

Referring to the drawings, FIGS. 1 to 21 show a handheld device according to an embodiment of the present invention. In these drawings, FIGS. 1 to 6 are external views of the handheld device; FIGS. 7 to 11 externally show the state in which a tablet is removed from the handheld device; FIG. 12 is a longitudinal sectional view of an engagement portion of the handheld device; FIG. 13 is a cross sectional view of the engagement portion of the handheld device; FIGS. 12A, 14 to 20 illustrate usage examples and operation examples of the handheld device; and FIG. 21 is a schematic block diagram.

Figure 1:
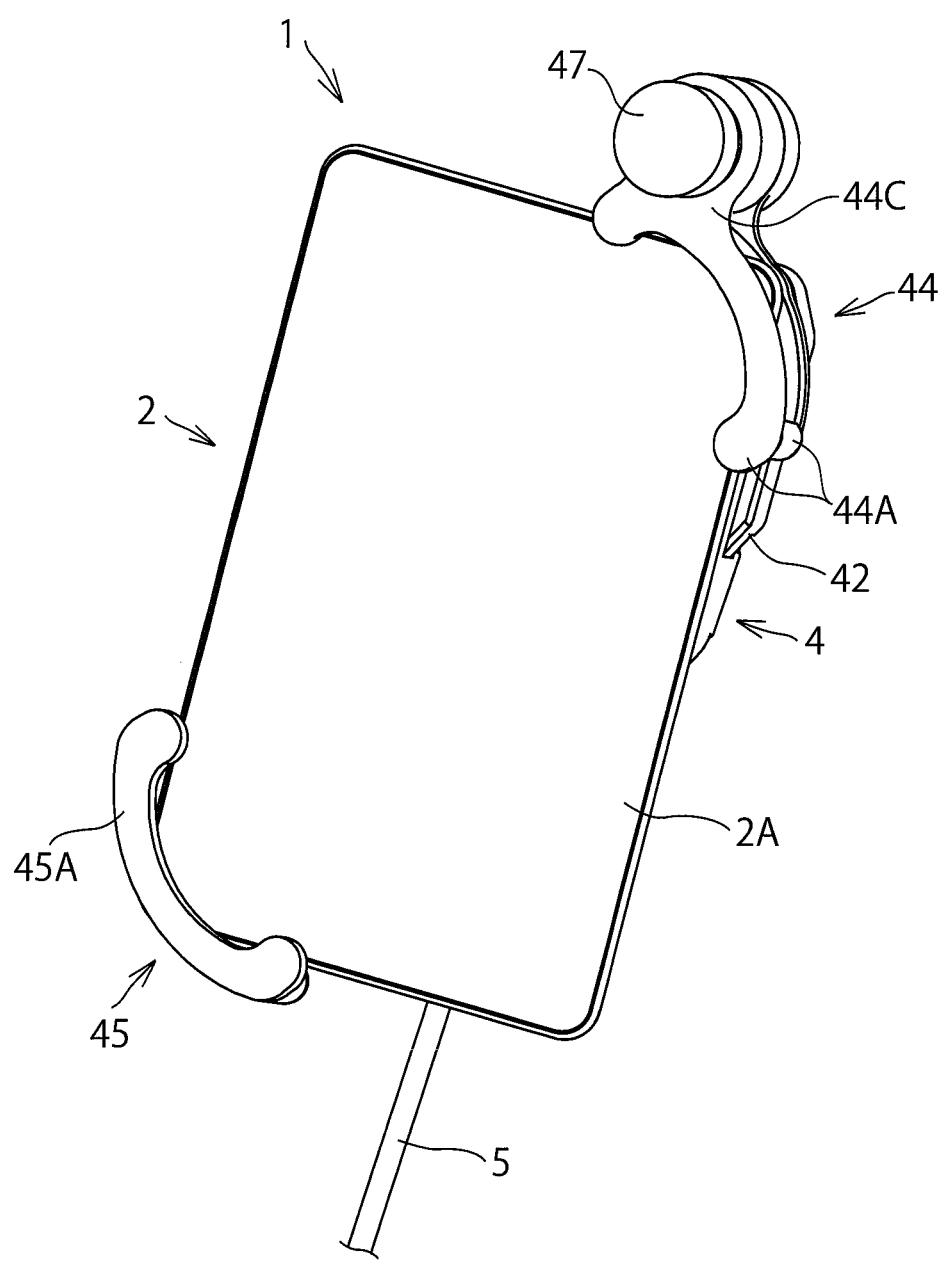
FIG. 1 is a general perspective view of a handheld device on the front side according to an embodiment of the present invention.
Figure 2:
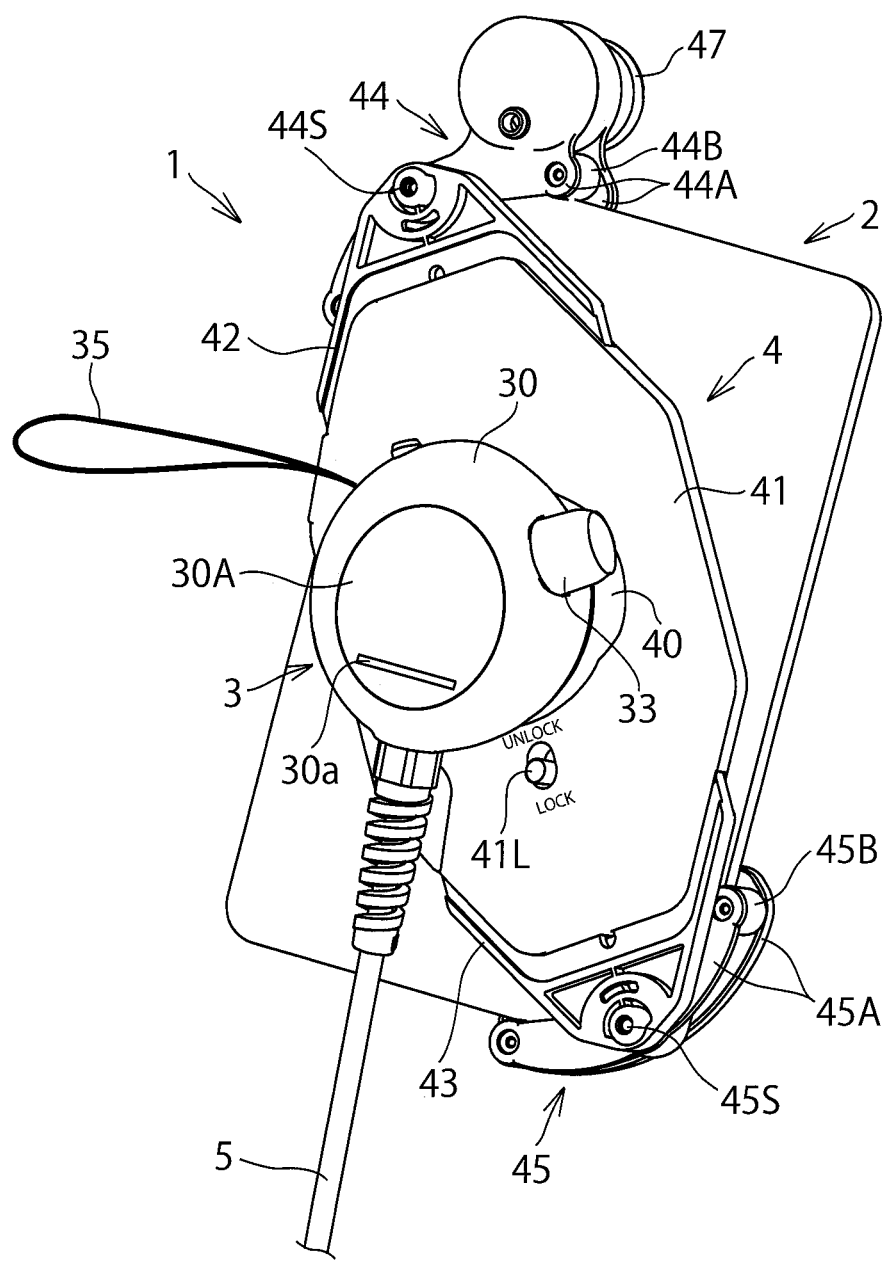
FIG. 2 is a general perspective view of the handheld device of FIG. 1 on the back side.
Figure 3:
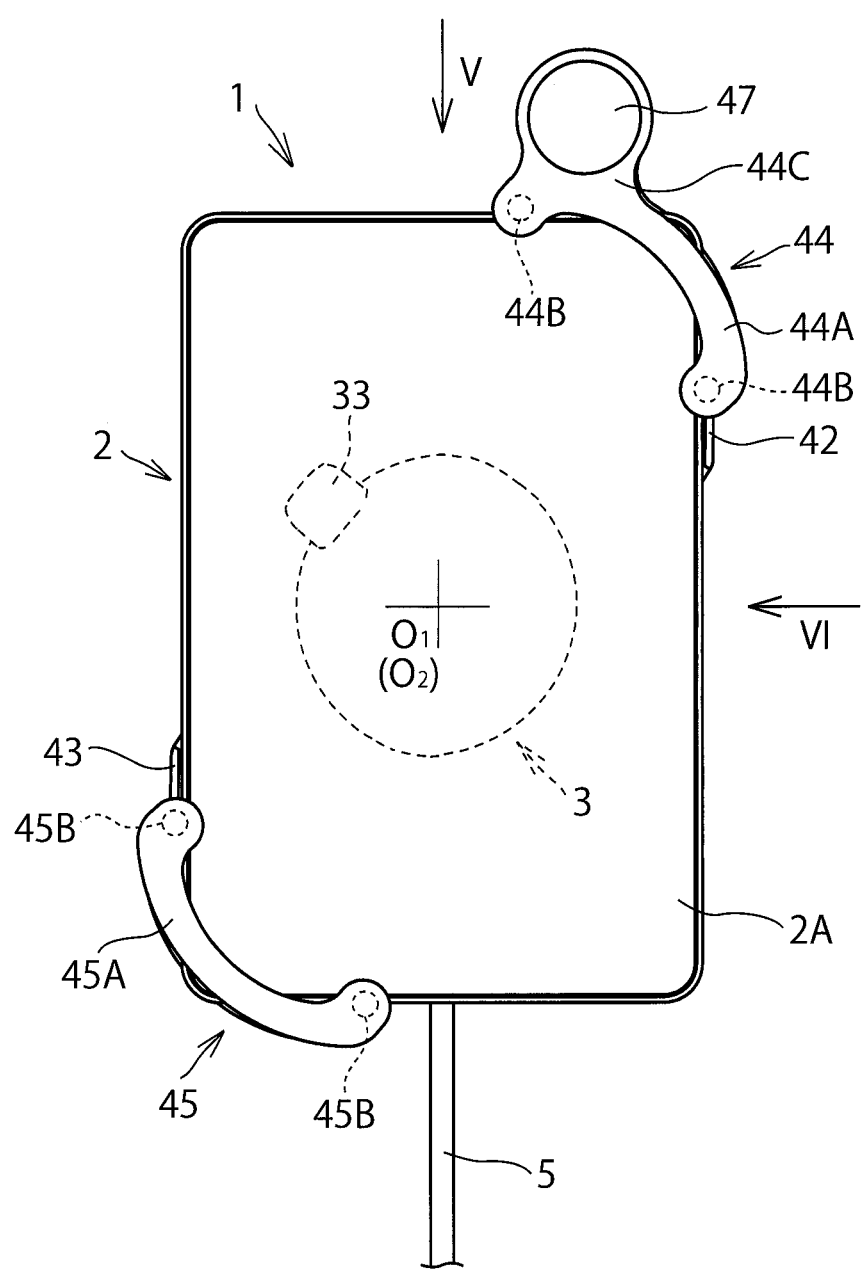
FIG. 3 is a front side or front elevational view of the handheld device of FIG. 1.
Figure 4:
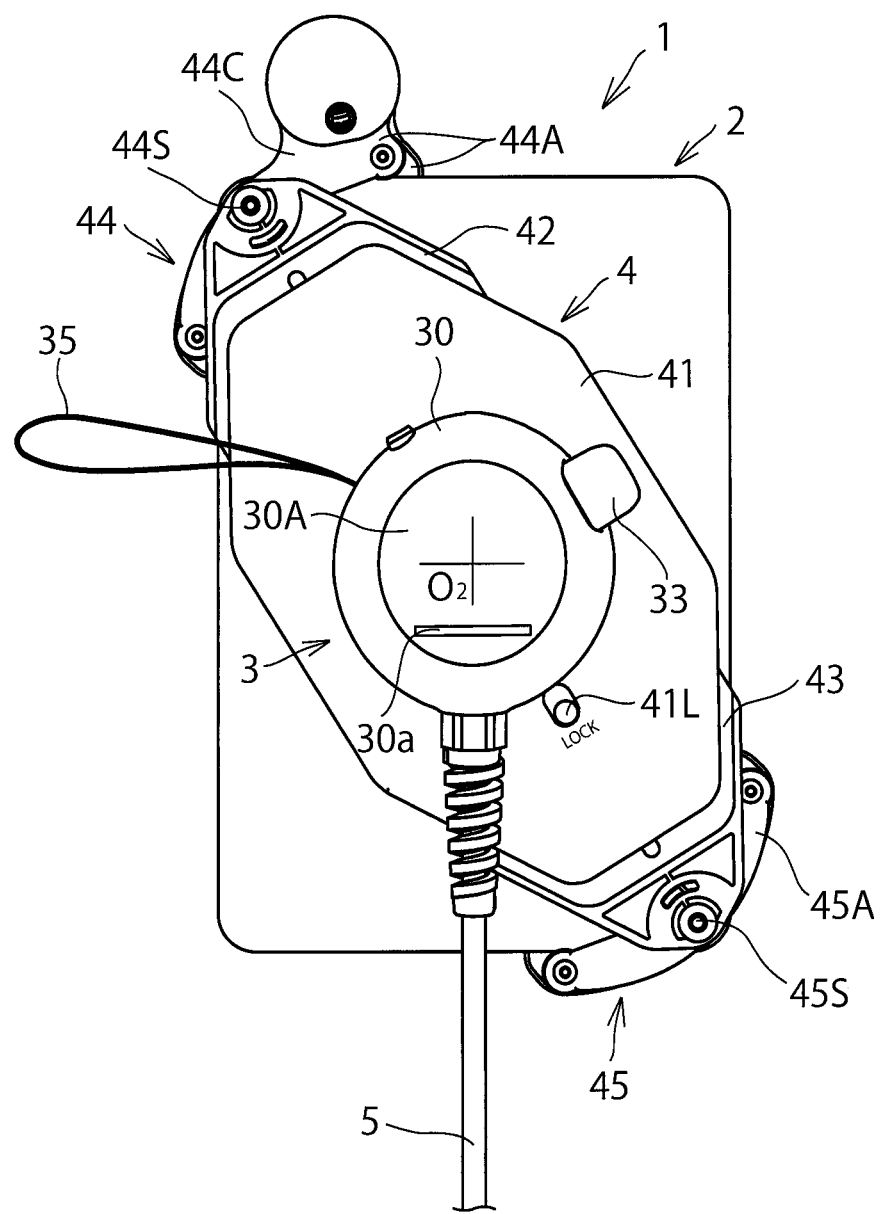
FIG. 4 is a backside or back elevational view of the handheld device of FIG. 1.
Figure 5:
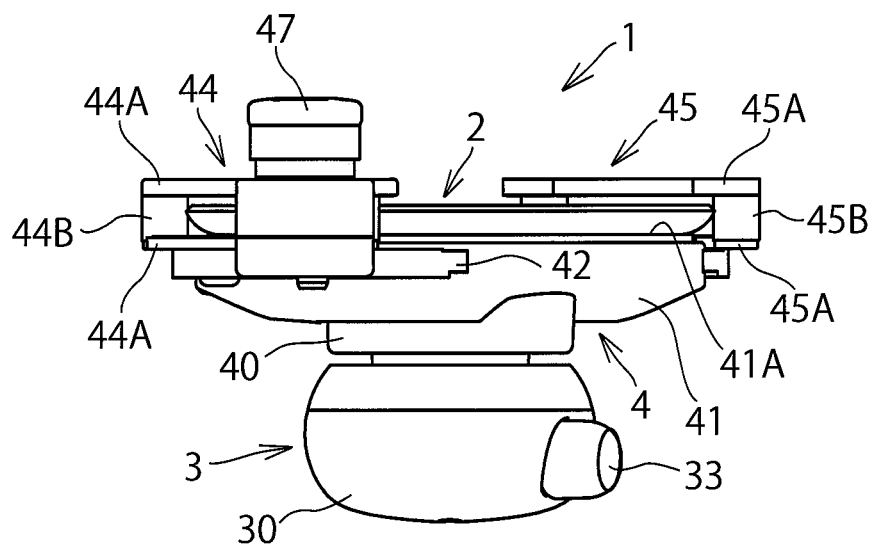
FIG. 5 is a view as viewed from the arrow V of FIG. 3.
Figure 6:
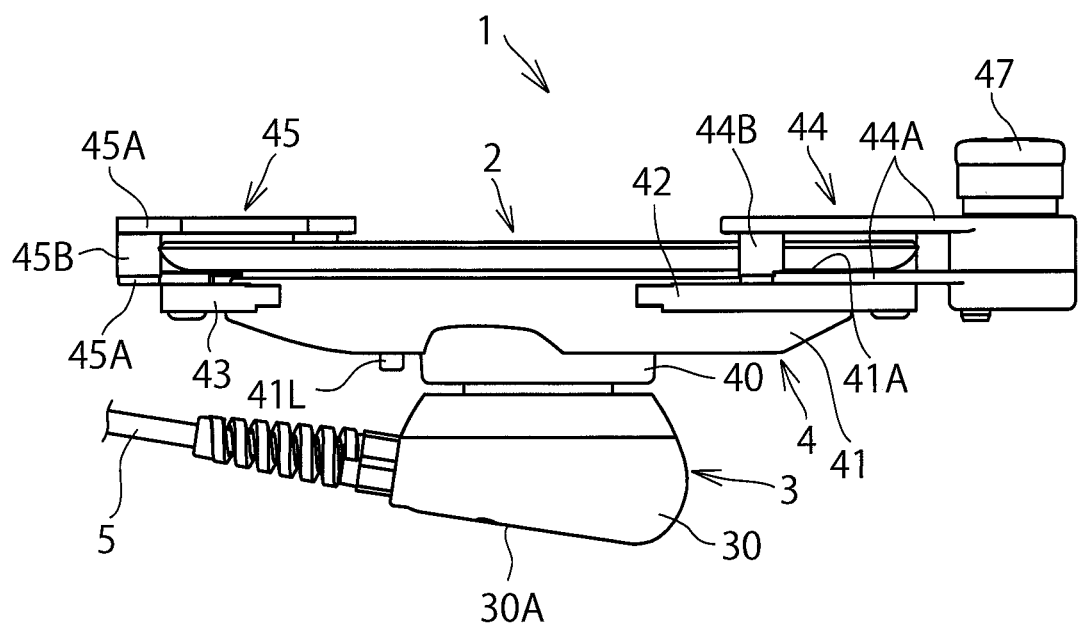
FIG. 6 is a view as viewed from the arrow VI of FIG. 3.
Figure 7:
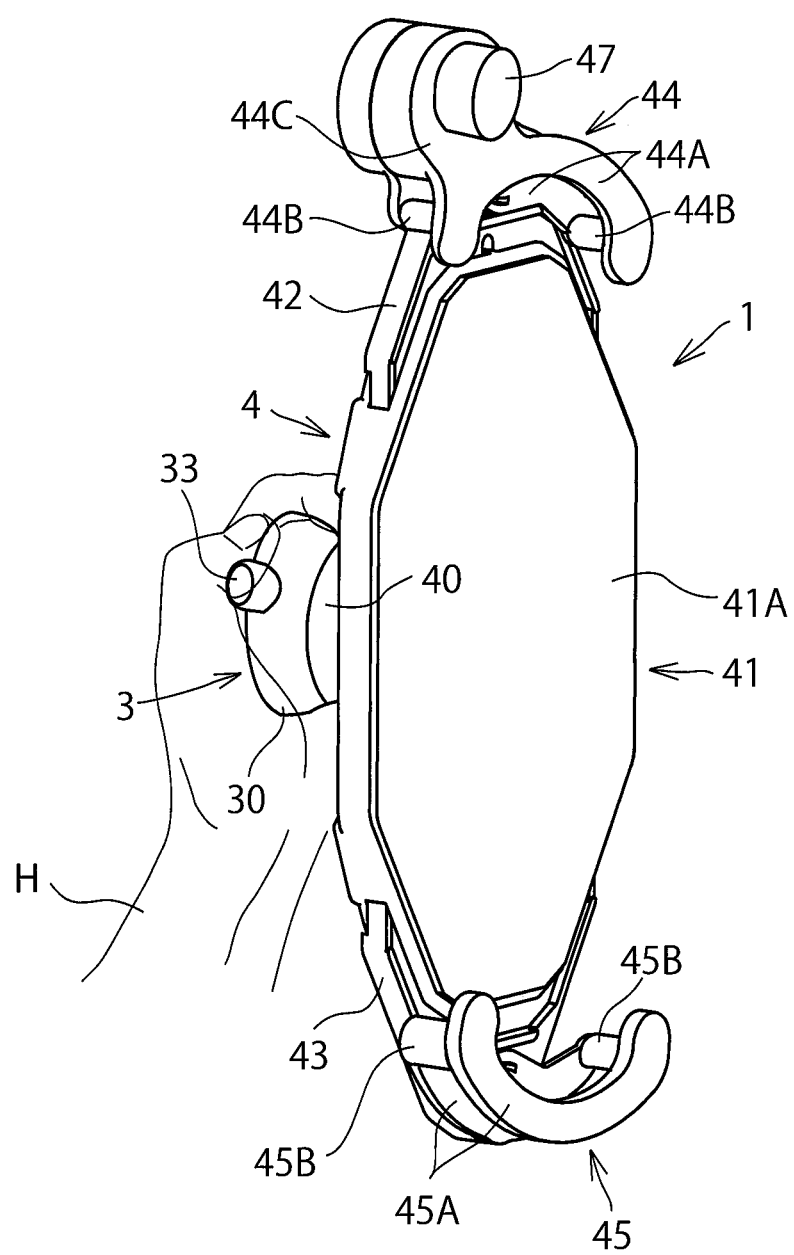
FIG. 7 is a general perspective view of the handheld device of FIG. 1 on the front side with a tablet removed from the device, illustrating the state in which an operator grips the grip part.
Figure 8:
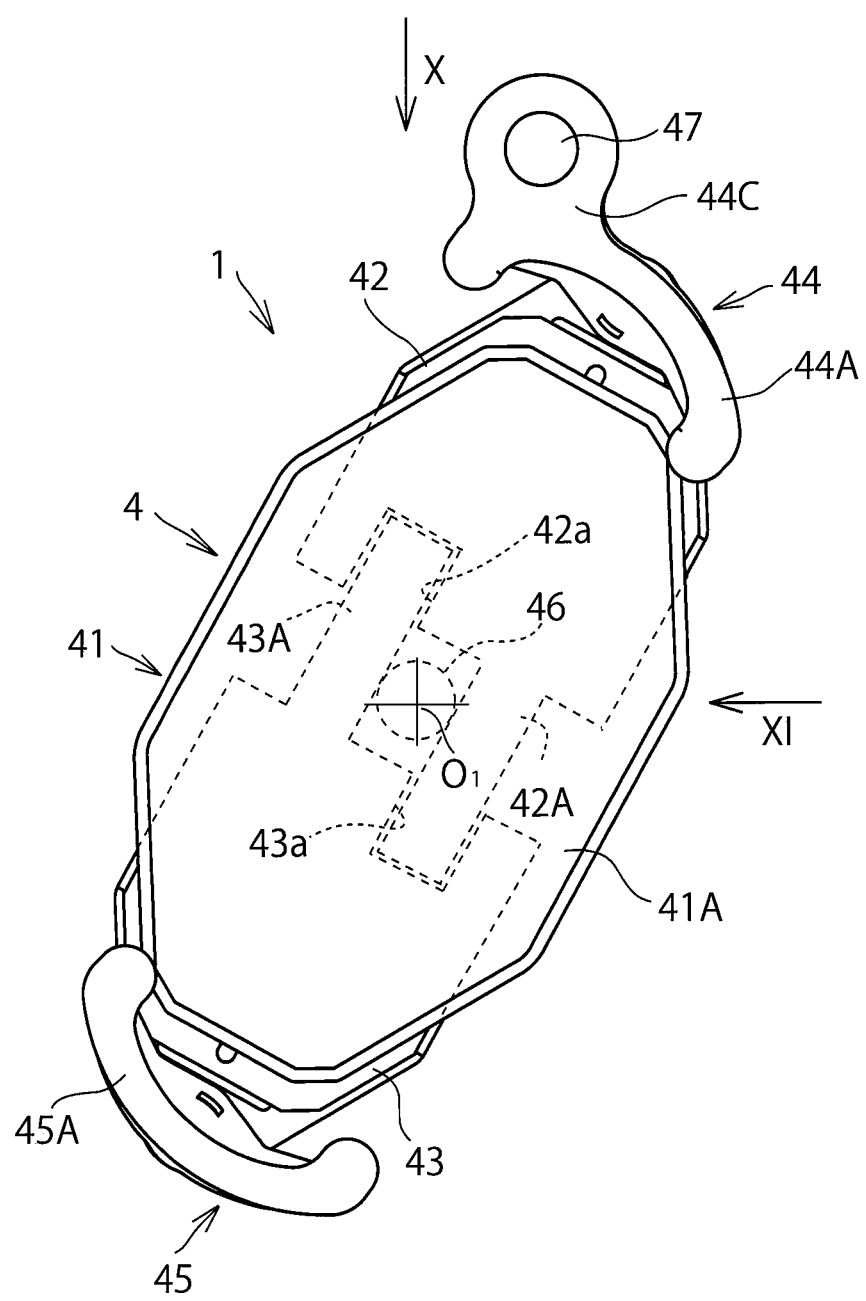
FIG. 8 is a front side or front elevational view of the handheld device of FIG. 7.
Figure 9:
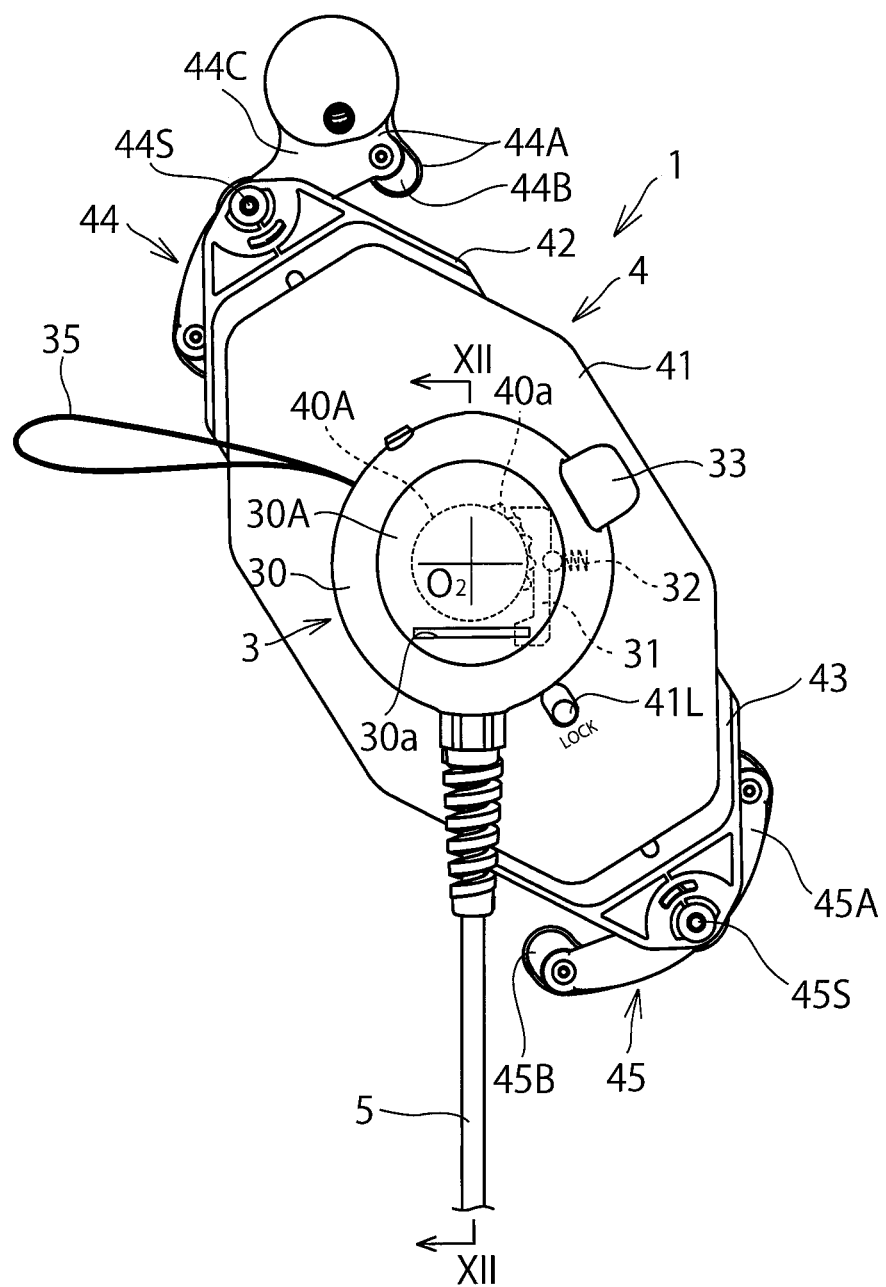
FIG. 9 is a back side or back elevational view of the handheld device of FIG. 7.
Figure 10:
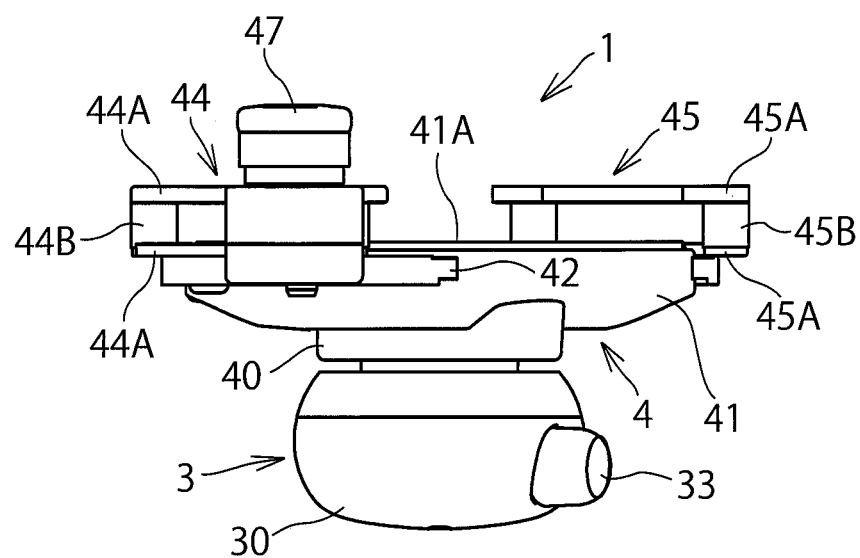
FIG. 10 is a view as viewed from the arrow X of FIG. 8.

For explanatory convenience, in the following description, the term "front side" of the handheld device designates the side where the tablet is disposed as shown in FIGS. 1, 3, 7 and 8, the term "backside" of the handheld device designates the side where the grip part is disposed as shown in FIGS. 2, 4 and 9. Also, the terms "top", "upper", and "above" respectively designate "top", "upper", and "above" with the tablet held horizontally or substantially horizontally in the handheld device. The terms "bottom", "lower", and "below" respectively designate "bottom", "lower", and "below" with the tablet held horizontally or substantially horizontally in the similar manner in the handheld device.

As shown in FIGS. 1 to 7, the handheld device (hereinafter simply referred to "device") 1 according to the present embodiment of the present invention outputs a signal (e.g. operation signal, control signal, etc.) to an external equipment (not shown, e.g. controller of a robot, control equipment of other machines, etc.). The device 1 includes a tablet 2 (body) as an operation/display panel disposed on the front side of the device 1, and a grip part 3 disposed on the backside of the device 1 and to be gripped by an operator to grip. In the current embodiment, the constitution having the tablet 2 and the grip part 3 is referred to as the handheld device 1. Therefore, a holder part 4 (mentioned below) provided with the grip part 3 is included in the handheld device 1 in the current embodiment.

The tablet 2 is a mobile operated terminal and the device 1 includes a holder part 4 for supporting and fixing the tablet 2. The grip part 3 is provided rotatably at the bottom portion 40 of the holder part 4. By such a structure, the grip part 3 is rotatable relative to the tablet 2 through the holder part 4. Speaking reversely, the tablet 2 is rotatable relative to the grip part 3 through the holder part 4.

As shown in FIGS. 2, 4 to 7, the grip part 3 has a flat spherical shape that is flat in the vertical direction. Here, the term "flat spherical shape" includes not only a flat sphere or a flat spherical body but also a flat substantial sphere or a flat substantial spherical body, a flat deformed sphere or a flat deformed spherical body, an oblate shape, an oblate ellipsoid, a flat polyhedron shape and the like. The bottom portion 30 of the grip part 3 is sized to fit in a palm of an operator H's hand (see FIG. 7). Also, the bottom portion 30 of the grip part 3 includes a planar bottom surface 30A (see FIG. 6), which is formed with a slit 30a. Additionally, the grip part 3 has a strap 35 fitted thereto that is to be wrapped around a wrist of the operator H to prevent falling of the device 1.

As shown in FIG. 3, when the center of the device 1 is positioned at a point $O_1$ (in this embodiment, the center $O_1$ substantially corresponds to the center of the tablet 2), the grip part 3 disposed on the backside of the device 1 is preferably located at the center $O_1$. In other words, the center $O_1$ is located at a region enclosed by the contour of the grip part 3 (the region is enclosed by a broken line in FIG. 3). More preferably, when the center of a rotational shaft of the grip part 3 is positioned at a point $O_2$, the center $O_2$ corresponds to the center $O_1$. Alternatively, the center $O_2$ is disposed in the vicinity of the center $O_1$.

Then, we will explain the details of the holder part 4 using FIGS. 5 to 11 and 15.

Respective drawings show the state in which the tablet 2 is removed from the holder part 4. The holder part 4 includes a base portion 41 for supporting the tablet 2, a pair of slide bases 42, 43 provided slidably at the base portion 41, and a pair of engagement portions 44, 45 provided at the distal ends of the respective slide bases 42, 43 to detachably engage with the tablet 2, in this example, to sandwich and hold the tablet 2 in a diagonal direction.

The base portion 41 includes a base surface 41A on which the tablet 2 is disposed. That is, in the state where the tablet 2 is supported by the base portion 41, the back surface of the tablet 2 is in contact with the base surface 41A of the base portion 41 (see FIGS. 5 and 6). In this exemplification, the base portion 41 has an elongated octagonal shaped base surface 41A, but it may be other polygonal shapes, alternatively, an elliptic shape, an elongated round shape, an egg shape, or an oval shape.

As shown in FIG. 8, the slide base 42 has a rack portion 42A extending in the elongated direction and formed with a rack gear inside the base portion 41. Similarly, the slide base 43 has a rack portion 43A extending in the elongated direction and formed with a rack gear inside the base portion 41. The rack portions 42A, 43A are arranged in parallel with the respective rack gears disposed against each other at a predetermined interval. Also, the slide base 42 has a concave portion 42a into which the rack portion 43A of the slide base 43 can enter. Likewise, the slide base 43 has a concave portion 43a into which the rack portion 42A of the slide base 42 can enter. Inside the base portion 41, a pinion 46 is rotatably supported. In this example, the center of the pinion 46 corresponds to the center $O_1$ of the device 1. The pinion 46 engages with the respective rack teeth of the rack portions 42A, 43A.

Figure 15:
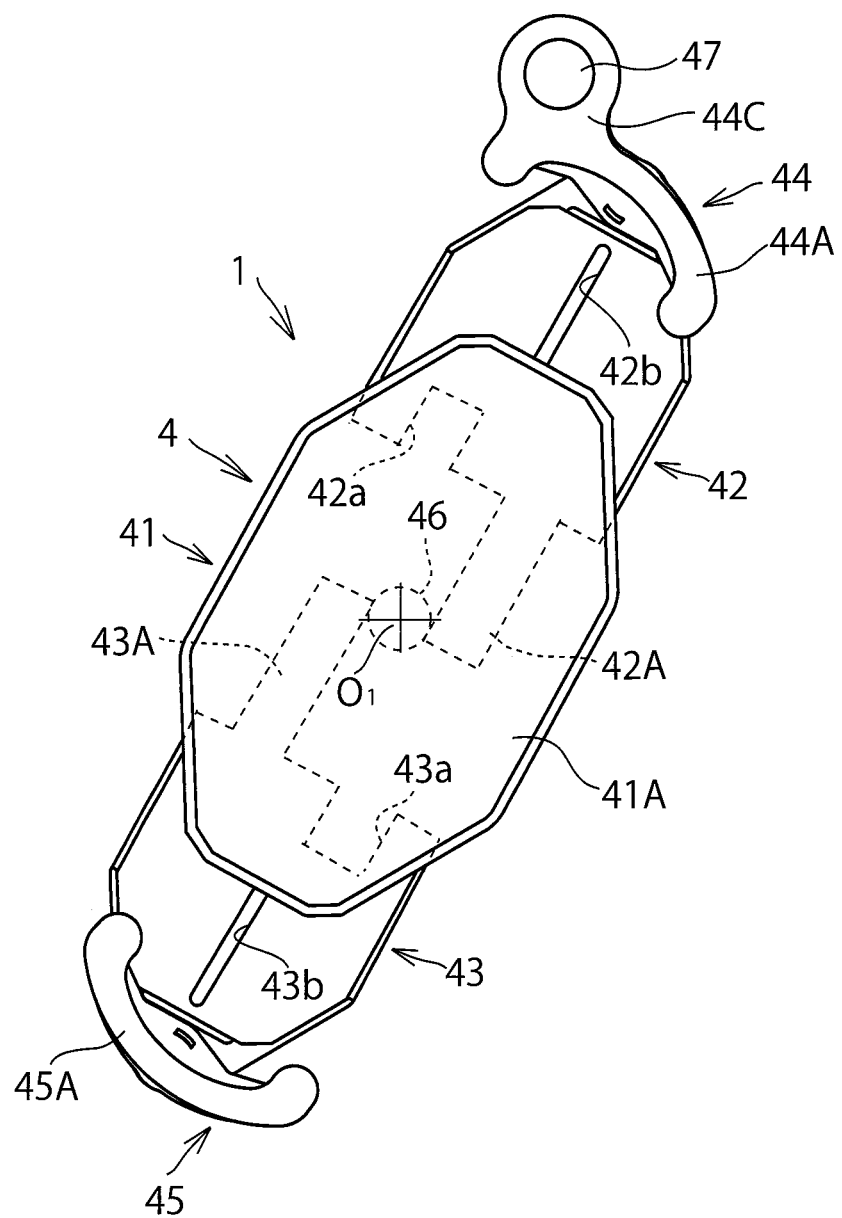
FIG. 15 is a front side or front elevational view of the handheld device in the state where the slide base is extended from the state of FIG. 8.
Figure 16:
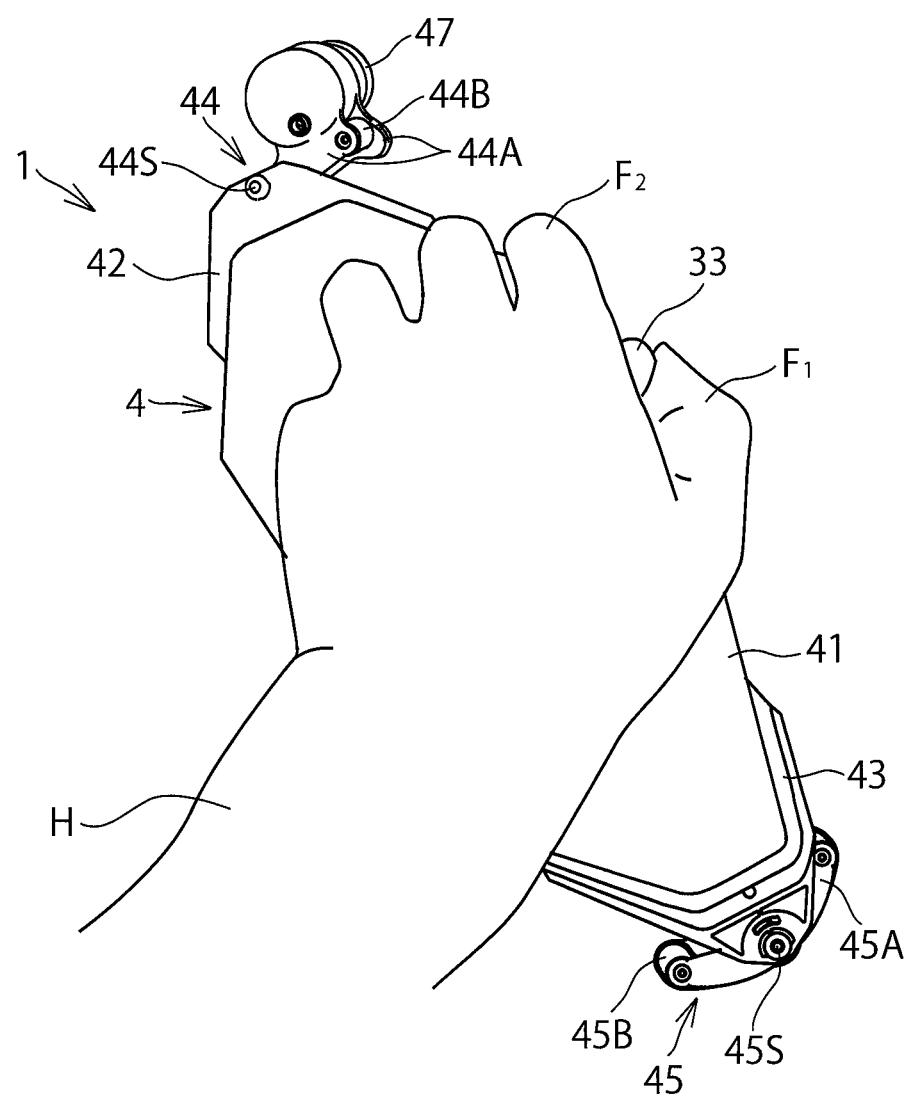
FIG. 16 is a general perspective view of the handheld device (but, tablet is omitted) of FIG. 1 on the backside, illustrating an operational example in which the device is operated by a left hand of the worker.

In such a manner, a double rack-and-pinion mechanism is structured. The slide bases 42, 43 are slidable between an access position where the slide bases 42, 43 are in proximity to each other as shown in FIG. 8 and a separate position where the slide bases 42, 43 are separated from each other as shown in FIG. 15. As a result, the respective engagement portions 44, 45 provided at the slide bases 42, 43 slide along with the slide bases 42, 43, such that thereby the distance between the respective engagement portions 44, 45 is changed and the device 1 can thus correspond to the tablet 2 of various sizes with ease. Also, the slide bases 42, 43 are formed with longitudinally extending guide grooves 42b, 43b, respectively. There are guide protrusions (not shown) that extend in the longitudinal direction inside the base portion 41. The guide protrusions slidably engage with the respective guide grooves 42b, 43b to guide the movement of the respective slide bases 42, 43.

At the backside surface of the base portion 41, there is provided a selector switch 41L to lock/unlock the slide movement of the respective slide bases 42, 43. As shown in FIG. 2, the selector switch 41L is movable inside an elongated hole to take a "LOCK" position and a "UNLOCK" position. As shown in FIG. 11, inside the base portion 41, there is provided a click member 41a that is swingable by the movement of the selector switch 41L. Inside the base portion 41, at the back surface of the slide base 43 (and the slide base 42), there is formed ratchet teeth 43c that the distal end of the click member 41a can engage with.

When the selector switch 41L moves to the LOCK position, the distal end of the click member 41a comes into engagement with the ratchet teeth 43c (see FIG. 11) to lock the slide base 43, thus locking the slide movement of the slide base 43. Concomitantly, the slide movement of the slide base 42 is also locked. On the other hand, when the selector switch 41L moves to the UNLOCK position, the distal end of the click member 41a is disengaged from the ratchet teeth 43c to unlock the lock state of the slide base 43, thus allowing for the slide base 43 to move slidably. Concomitantly, the slide movement of the slide base 42 is also allowed to be movable. In addition, the ratchet teeth 43c may be structured such that the respective slide bases 42, 43 can slide-move only in the access direction when the selector switch 41L is in the LOCK position.

The engagement portion 44 is provided at the distal end of the slide base 42. The engagement portion 44 includes a pair of arm portions 44A respectively extending arcuately and disposed opposite each other at a vertical distance, and a pair of cylindrical spacers 44B disposed at both ends of the respective arm portions 44A between the respective arm portions 44A and interconnecting the respective arm portions 44A. The axial length of the respective spacers 44B is set greater than the thickness of the tablet 2 to allow for the tablet 2 to be inserted between the respective arm portions 44A (see FIGS. 5, 6). The respective arm portions 44A are supported swingably by a support shaft 44S (FIG. 9) provided at the distal end of the slide base 42. At the time of engagement of the tablet 2, the respective arm portions 44A are disposed at a right-side corner on the front upper side of the tablet 2 and the respective spacers 44B are adapted to contact the respective end surfaces to compose the corner.

Similarly, the engagement portion 45 is provided at the distal end of the slide base 43. The engagement portion 45 includes a pair of arm portions 45A respectively extending arcuately and disposed opposite each other at a vertical distance, and a pair of cylindrical spacers 45B disposed at both ends of the respective arm portions 45A between the respective arm portions 45A and interconnecting the respective arm portions 45A. The axial length of the respective spacers 45B is set greater than the thickness of the tablet 2 to allow for the tablet 2 to be inserted between the respective arm portions 45A (see FIGS. 5, 6). The respective arm portions 45A are supported swingably by a support shaft 45S (FIG. 9) provided at the distal end of the slide base 43. At the time of engagement of the tablet 2, the respective arm portions 45A are disposed at a left-side corner on the front lower side of the tablet 2, which is a diagonal position relative to the right-side corner on the front upper side of the tablet 2, and the respective spacers 45B are adapted to contact the respective end surfaces to compose the corner.

Next, the rotational mechanism of the grip part 3 will be explained using FIG. 9.

As shown in FIG. 9, the lower portion 40A of the bottom portion 40 of the holder part 4 has a cylindrical shape, which is formed with ratchet teeth 40a along the entire perimeter (in FIG. 9, a portion of the ratchet teeth 40a is shown). On the other hand, inside the grip part 3, there are provided a click member 31 in engagement with the rachet teeth 40a and a spring 32 to bias the click member 31 toward the ratchet teeth 40. In this exemplification, the ratchet teeth 40 is rotatable in both the forward and reverse directions. That is, in the state in which the click member 31 is constantly in engagement with the ratchet teeth 40a due to the action of the biasing force of the spring 32, the grip part 3 is rotatable in the forward and reverse directions relative to the bottom portion 40 of the holder part 4. In other words, the holder part 4 (and thus the tablet 2 held by the holder part 4) is rotatable in the forward and reverse directions around the grip part 3.

Such a forwardly/reversely rotatable ratchet mechanism causes the grip part 3 not to rotate unless a certain amount of rotational force is applied at the start of rotation of the grip part 3, such that thereby the rotational position of the grip part 3, i.e. the orientation of the tablet 2 can be maintained.

At the outer circumferential surface of the grip part 3, a push-button enable switch 33 is provided. As shown in FIGS. 12 and 13, the terminal 33a of the enable switch 33 is connected to an end of the cable 5 inside the grip part 3 (in the respective drawings, a connecting condition is not shown). The cable 5 extends outside the device 1 and the other end of the cable 5 is connected to an external equipment. In addition, a connection of the cable 5 with the external equipment may be conducted using a connector. FIG. 12A shows an example in which a female connector 50A is fitted to the distal end of the cable 5, an attachable/detachable male connector 50B relative to the female connector 50A is fitted to a connection side of the external equipment, and every time in using the device 1 the respective connectors 50A, 50B are connected to each other. Also, with regard to the enable switch 33, in the state where the push button is not pressed, the contact of the enable switch 33 is OFF and the enable switch 33 does not output a signal to the external equipment. From this state, when the push button is lightly pressed, the contact turns ON and the enable switch 33 outputs a signal to the external equipment to enable a teaching work to be performed. When a finger leaves the push button, the signal output to the external equipment is stopped. On the other hand, when the push button is lightly pressed and then strongly pressed, the contact of the enable switch 33 turns OFF and it stops outputting the signal to the external equipment.

Also, at the arm portion 44A composing the engagement portion 44, there is integrally formed a flange portion 44C that extends outwardly from the arm portion 44A (see FIG. 7). An emergency stop switch 47 is provided at the flange portion 44C. The emergency stop switch 47 is connected to the external equipment through a cable (not shown).

FIG. 21 is a schematic block diagram of the device 1. As shown in FIG. 21, the tablet 2 of the device 1 is connected to such as, but not limited to a robot controller RC as an external equipment by radio or wireless signal. Also, the enable switch 33 and the emergency stop switch 47 are connected to the controller RC through a cable 5, 6, respectively.

Next, function and effect of the present embodiment will be explained.

When constructing or assembling the device 1 by attaching the tablet 2 to the holder part 4, the selector switch 41L on the backside of the base portion 41 is moved to the UNLOCK position and from that state the operator slides the respective slide bases 42, 43 in the direction away from each other through the respective engagement portions 44, 45 to increase the distance between the respective engagement portions 44, 45 (see FIG. 15). Then, the tablet 2 is disposed on the base surface 41A on the front side of the base portion 41. From the state, the operator slides the respective slide bases 42, 43 in the direction toward each other through the respective engagement portions 44, 45 to decrease the distance between the respective engagement portions 44, 45. By so doing, the respective spacers 44B, 45B of the respective engagement portions 44, 45 come into contact with the respective end surfaces of the respective diagonal corners of the tablet 2. Then, the selector switch 41L is moved to the LOCK position to lock the respective slide base 42, 43. Thereby, the state in which the tablet 2 is sandwiched and held by the engagement portions 44, 45 can be maintained (see FIGS. 1 to 4).

In such a way, when attaching the tablet 2, since the distance between the respective engagement portions 44, 45 can be once increased and then changed to an appropriate one, an attachment of the tablet 2 to the base surface 41A of the base portion 41 can be conducted easily and smoothly.

When using the device 1, the operator grips the grip part 3 on the backside of the device 1 by a hand. At this time, as shown in FIG. 7 (in the drawing, the tablet 2 is not shown and for illustration purposes the device 1 is shown in a standing or upright position), since the bottom portion 30 of the grip part 3 is sized to fit in a palm of the operator H's hand, the operator H can support the device 1 securely and stably. Moreover, at this moment, since the operator H grips the grip part 3 with the palm of his/her hand toward the frontside of the device 1, i.e. upward, the device 1 can be supported and held from below in a stable manner. Furthermore, since the grip part 3 has a flat spherical shape, a grip with a palm upward can be conducted with ease.

By such a method of grip, even when the tablet 2 grows in size, the tablet 2 can be stably supported from below, and even when the tablet 2 gains in weight, the tablet 2 is easy to hold. Thereby, even when the operator holds the tablet 2 for a long span of time, he/she does not get tired, thus reducing the burden of the operator H. Also, the grip part 3 is disposed at the center $O_1$ of the device 1, that is, the center $O_1$ is disposed at the region (the region enclosed by a broken line in FIG. 3) that the grip part 3 encompasses. More preferably, the center $O_2$ of the grip part 3 corresponds to the center $O_1$ or is disposed in the vicinity of the center $O_1$. In summary, the grip part 3 is located at or in the vicinity of the center of gravity of the device 1. Thereby, when gipping the grip part 3 to hold and support the device 1, the operator H can support the device 1 in a balanced way thus easing the burden of the operator H.

In operating the device 1, the operator H grips the grip part 3 with one hand, for instance, a left hand (see FIG. 7) to support the tablet 2. At this moment, as shown in FIG. 1, since the enable switch 33 of the grip part 3 can be disposed at a position of such as a first finger or thumb $F_1$ of the left hand of the operator H, the operator H can press and operate the enable switch 33 with the first finger or thumb $F_1$ of the left hand. Thereby, the enable switch 33 outputs a signal to the external equipment and the operator H can perform a teaching work and so on for the robot. Also, during this time, since the operator H can perform a touch operation of the tablet 2 with the other hand, such as a right hand, operability of the device 1 can be improved.

Figure 17:
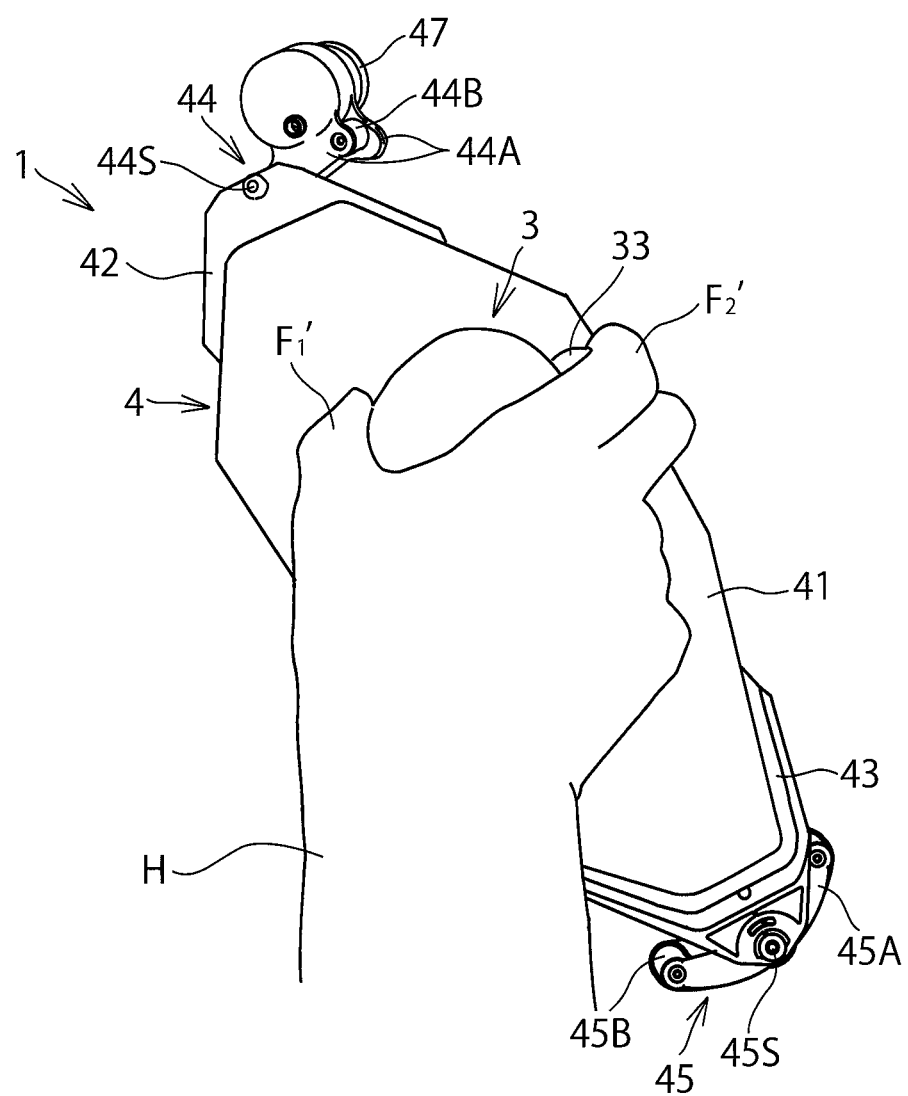
FIG. 17 is a general perspective view of the handheld device (but, tablet is omitted) of FIG. 1 on the backside, illustrating an operational example in which the device is operated by a right hand of the worker.

On the other hand, when the operator H grips the grip part 3 with his/her right hand to support the tablet 2, as shown in FIG. 17, since the enable switch 33 of the grip part 3 can be disposed at a position of such as a forefinger or index finger $F_2'$ of the right hand of the operator H, the operator H can press and operate the enable switch 33 with the forefinger or index finger $F_2'$ of the right hand. Thereby, the enable switch 33 outputs a signal to the external equipment and the operator H can perform a teaching work and so on for the robot. Also, during this time, since the operator H can perform a touch operation of the tablet 2 with a left hand, operability of the device 1 can be improved.

In such a manner, since the device 1 can be supported by both a right hand and a left hand, the device 1 can be used by both a right-handed operator and a left-handed operator and both the right-handed and left-handed operators can easily perform the operation of the enable switch 33. Thereby, the operator can operate the enable switch 33 without feeling stress.

Also, in this case, since the grip part 3 is provided rotatably, it is also possible that individual operators rotates the grip part 3 to move the enable switch 33 at an easy-to-operate position such as a position in which the enable switch 33 is easy to operate with a forefinger $F_2$ of a left hand or a thumb $F_1'$ of a right hand unlike the above-mentioned example. Thereby, the individual operators can operate the enable switch 33 without feeling stress, thus enhancing operability of the device 1.

Moreover, due to a rotatability of the grip part 3, the operator H can rotate the tablet 2 with the grip part 3 gripped by the operator H, such that thereby the orientation of the tablet 2 can be changed. The tablet 2 can thus be used both vertically and horizontally (alternatively, in an orientation other than these orientations). Also, in those cases as well, since both the right-handed and left-handed operators can operate the enable switch 33, the operators can perform an operation of the enable switch 33 without feeling stress. As a result, operability of the device 1 can be improved.

Also, since the center $O_2$ of the rotational shaft of the grip part 3 corresponds to the center $O_1$ of the device 1 or is disposed in the vicinity of the center $O_1$, the grip part 3 is disposed at or in the vicinity of the center of gravity of the device 1. Therefore, even when the operator rotates the holder part 4 along with the tablet 2 with the grip part 3 gripped by the operator, the grip part 3 still remains at or in the vicinity of the center of gravity of the device 1, such that thereby the operator can support the device 1 in a balanced manner regardless of before and after the rotation of the tablet 2 thus relieving the burden of the operator.

Additionally, in the case that the grip part 3 is disposed at the center $O_1$ of the device 1 and the center $O_2$ of the rotational shaft of the grip part 3 corresponds to the center $O_1$ of the device 1 or is disposed in the vicinity of the center $O_1$, when the grip part 3 is rotated, the enable switch 33 and the emergency stop switch 47 are positioned on a concentric circle centered at the center $O_2$ of the rotational shaft of the grip part 3. Therefore, by the rotation of the grip part 3, operability of the enable switch 33 and the emergency stop switch 47 is not lowered, thus maintaining a high operability.

Figure 18:
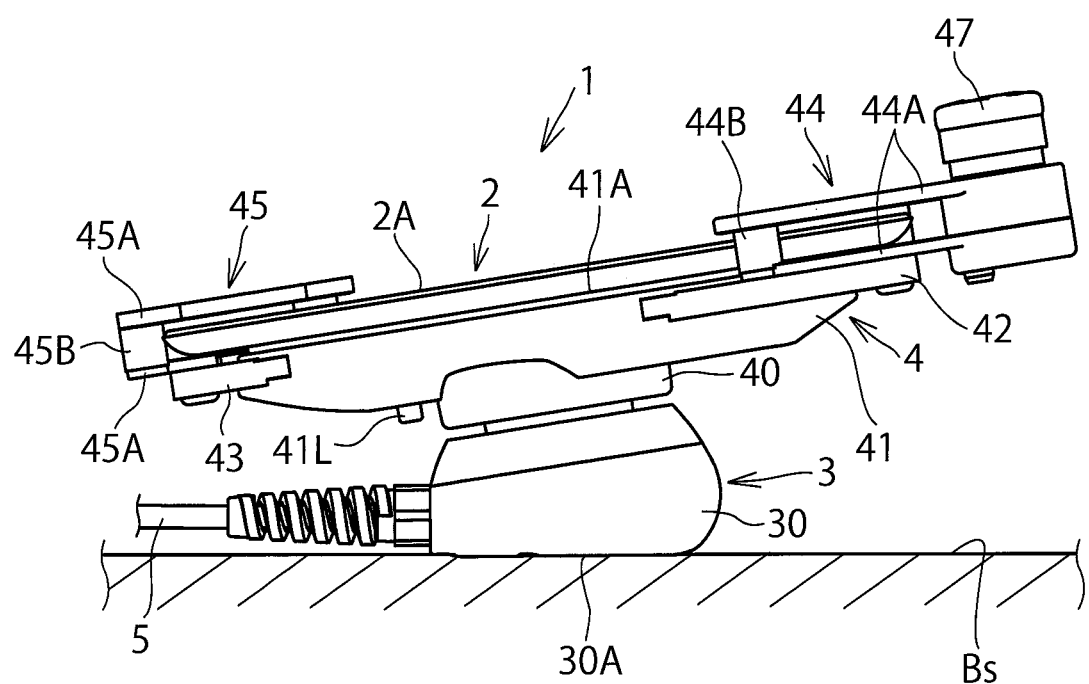
FIG. 18 is a side view of the handheld device of FIG. 1, illustrating a usage example in which the device is disposed and used on a table.
Figure 19:
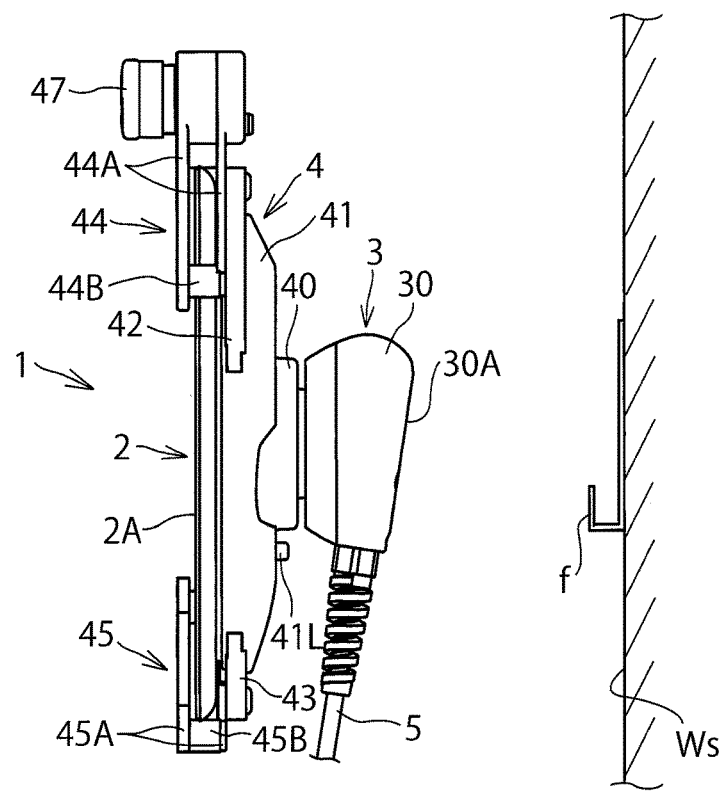
FIG. 19 is a side view of the handheld device of FIG. 1, illustrating a usage example in which the device is hung and used on a wall.
Figure 20:
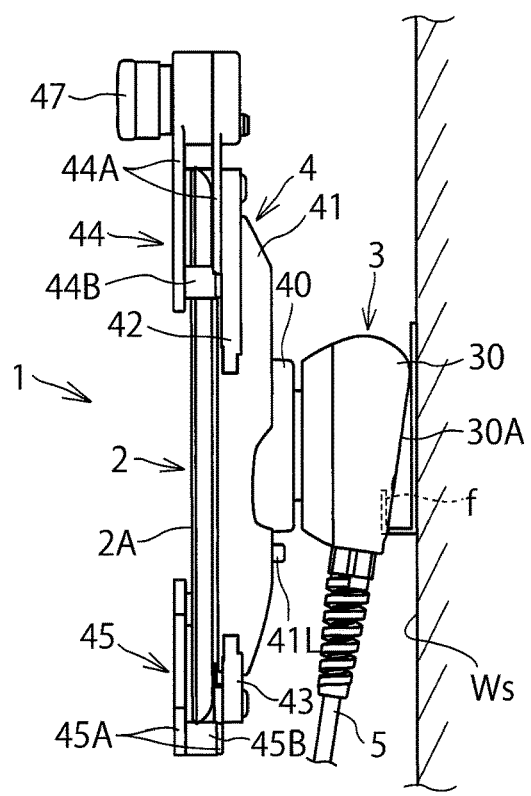
FIG. 20 is a side view of the handheld device of FIG. 1, illustrating a usage example in which the device is hung and used on a wall.
Figure 21:
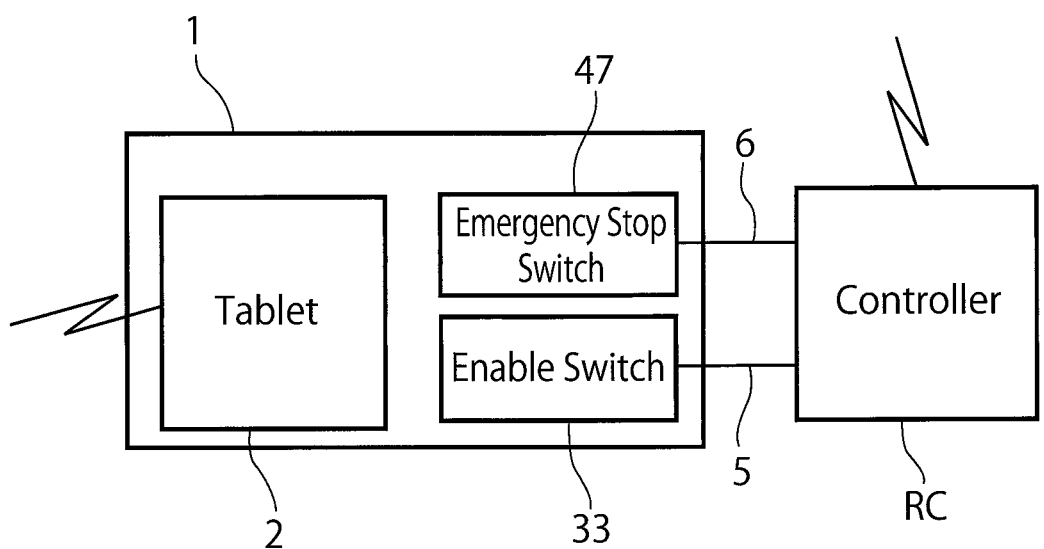
FIG. 21 is a schematic block diagram of the handheld device of FIG. 1.
Figure 22:
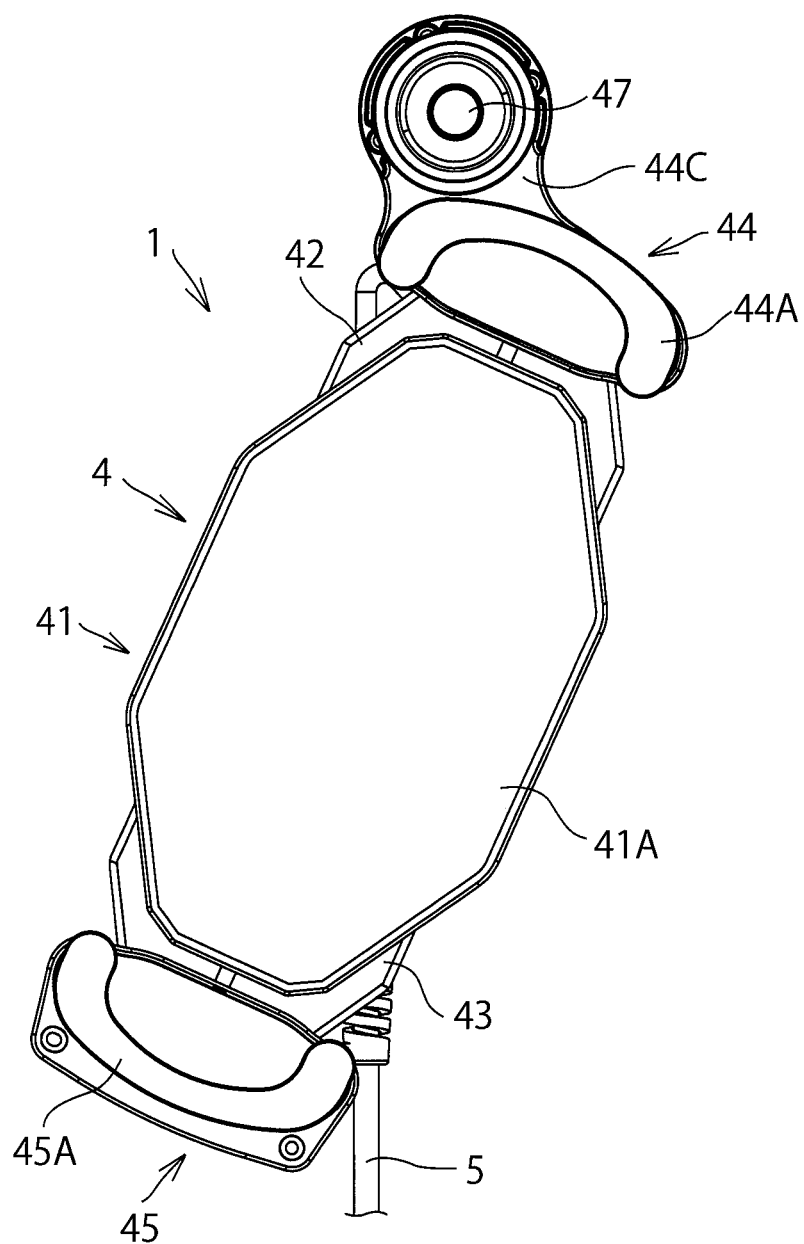
FIG. 22 is a front elevational view of another embodiment of the handheld device (but, tablet is omitted) of FIG. 1.
Figure 23:
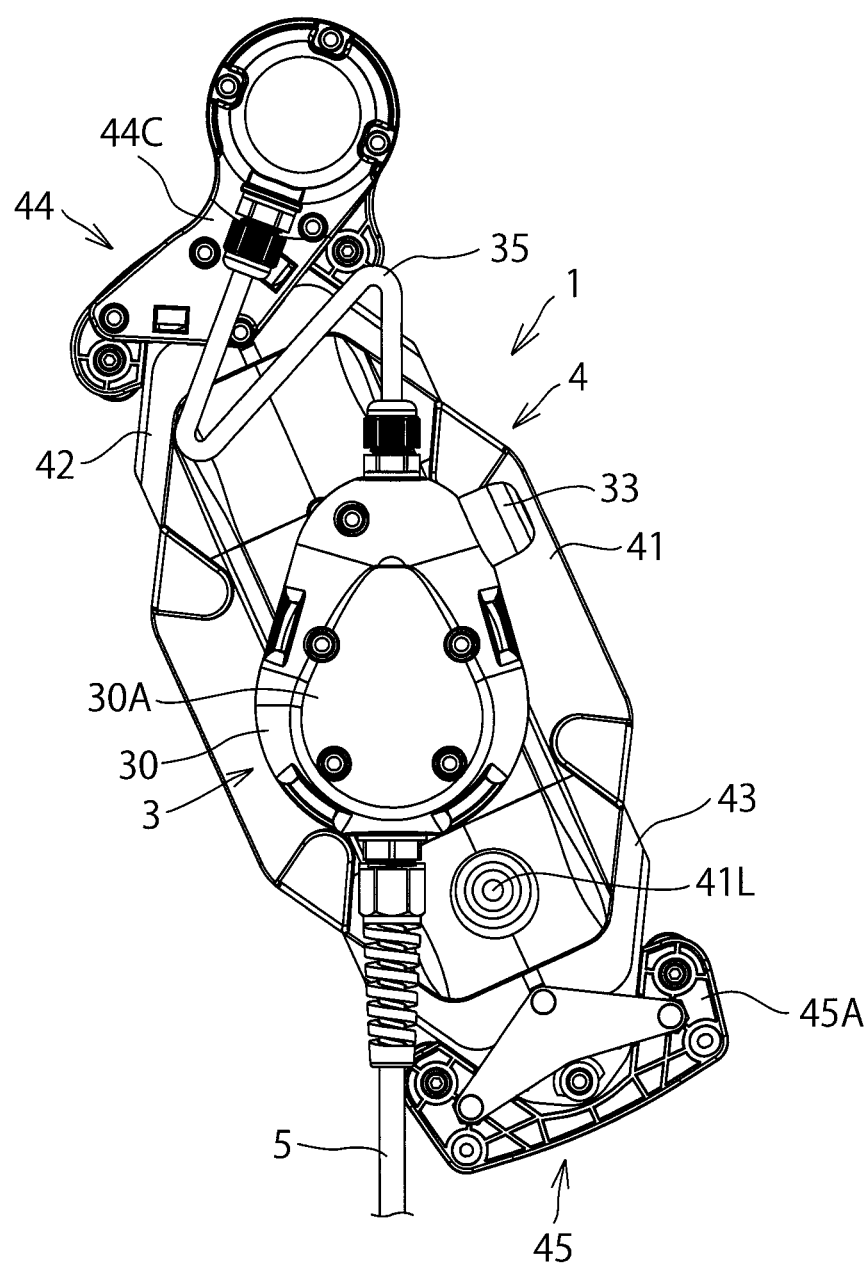
FIG. 23 is a back elevational view of another embodiment of the handheld device of FIG. 22.
Figure 24:
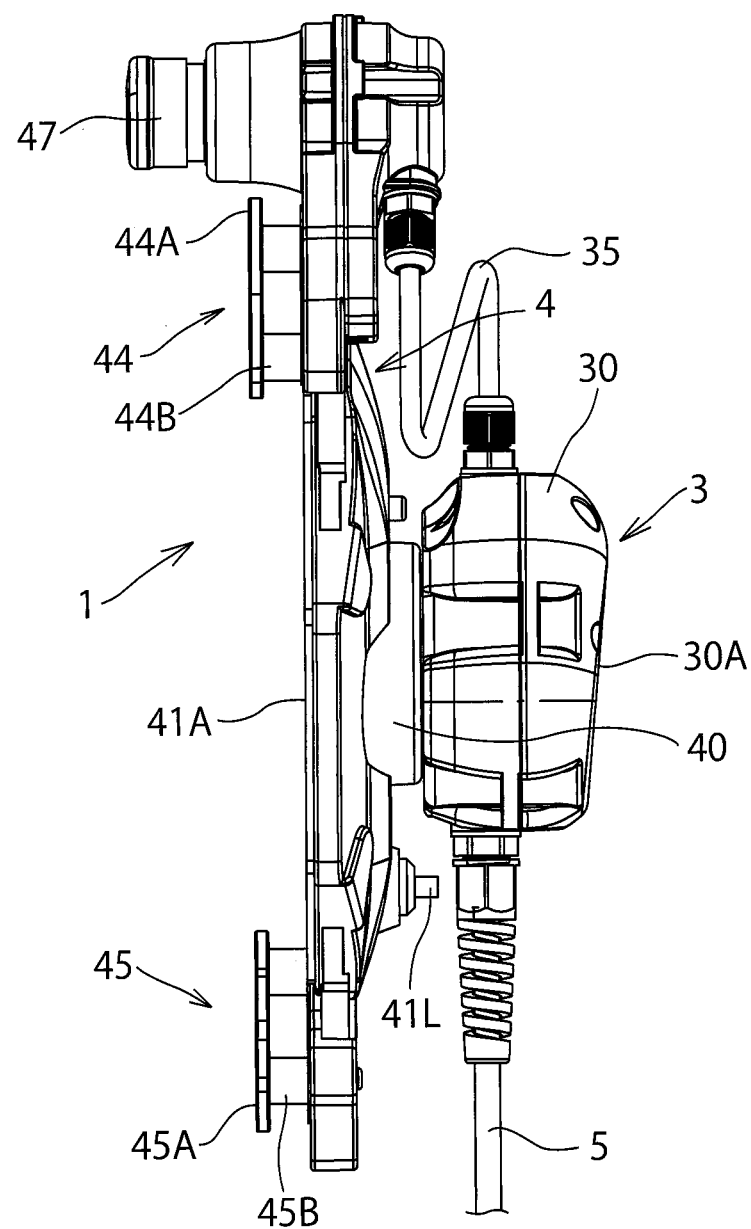
FIG. 24 is a right-side view of another embodiment of the handheld device of FIG. 22.
Figure 25:
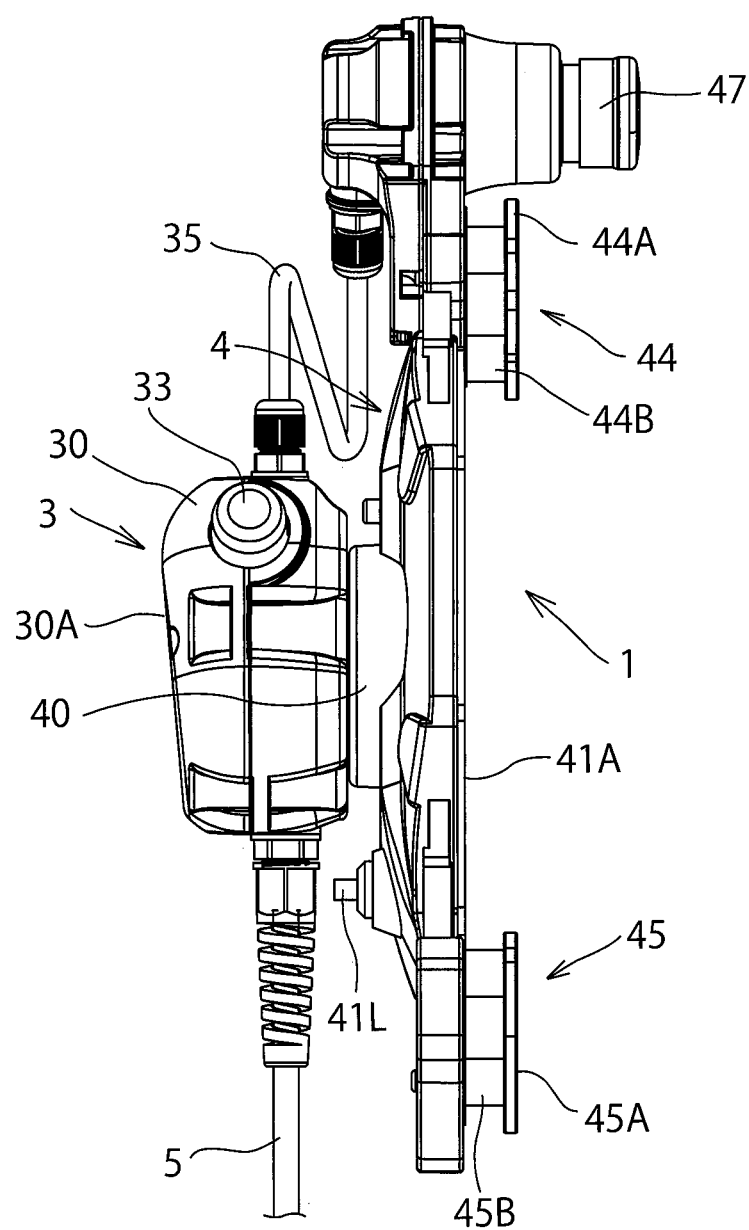
FIG. 25 is a left-side view of another embodiment of the handheld device of FIG. 22.
Figure 26:
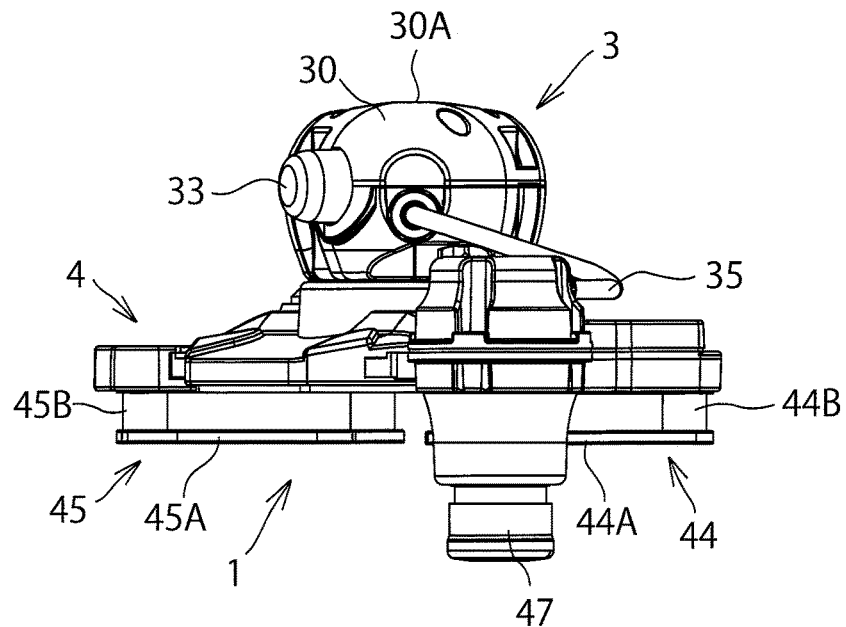
FIG. 26 is a top plan view of another embodiment of the handheld device of FIG. 22.
Figure 27:
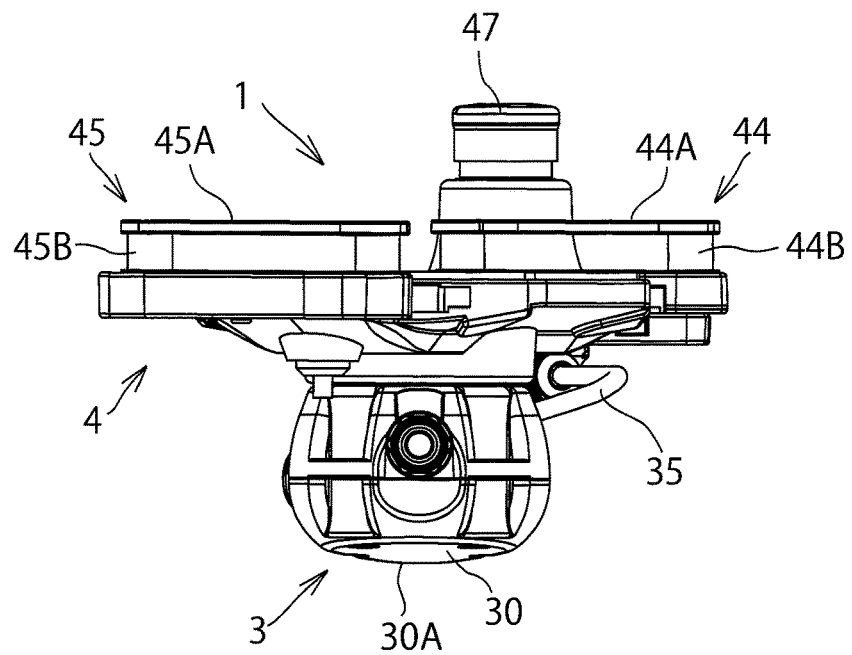
FIG. 27 is a bottom plan view of another embodiment of the handheld device of FIG. 22.

In the usage of the above-mentioned device 1, an example was shown in which the device 1 was used with the grip part 3 of the device 1 gripped by the hand of the operator, but in the present invention other usages such as shown in FIGS. 18 to 20 are possible.

A usage shown in FIG. 18 indicates an example in which the device 1 is placed and used on a table Bs. As mentioned above, since the grip part 3 is disposed at the center $O_1$ of the device 1 and the lower surface 30A of the bottom portion 30 of the grip part 3 is planar in shape, when the lower surface 30A is placed on the table Bs, the device 1 is flatly arranged on the table Bs stably without wobbling. Then, by rotating the tablet 2 along with the holder part 4 around the grip part 3, the orientation of the tablet 2 on the table Bs can be changed. In this fashion, the device 1 can be used on the table Bs as well.

Moreover, in this case, since the lower surface 30A of the grip part 3 is disposed not parallel to but at an angle relative to the base surface 41A of the base portion 41 of the holder part 4, a screen 2A of the tablet 2 can be arranged at an easy-to-view angle for the operator.

A usage shown in FIGS. 19 and 20 indicates an example in which the device 1 is hung and used on a wall surface Ws. As mentioned above, since the lower surface 30A of the grip part 3 is formed with the slit 30a (see FIG. 9), by engaging a hook member fitted on the wall surface Ws with the slit 30a (see FIGS. 19 and 20), the device 1 can be hung on the wall surface Ws. Then, by rotating the tablet 2 along with the holder part 4 around the grip part 3, the orientation of the tablet 2 on the wall surface Ws can be changed. In this manner, the device 1 can be used on the wall surface Ws as well.

First Alternative Embodiment

In the above-mentioned embodiment, an example was shown in which the forward/reverse ratchet mechanism was employed as a rotational mechanism of the grip part 3, the rotational direction of the grip part 3 may not be bidirectional including both forward and rearward and a ratchet mechanism for allowing only unidirectional rotation may be provided. Also, a stopper (not shown) may fix the rotational position without providing a ratchet mechanism.

Second Alternative Embodiment

In the above-mentioned embodiment, a flat spherical shape as a preferred shape of the grip part 3 was taken as an example, but the shape of the grip part 3 may not be flat. A spherical shape, a substantially spherical shape, a deformed spherical shape and the like may be employed. Also, a convex (or concave) polyhedral shape may be adopted. Moreover, as a flat spherical shape, an oblate spheroidal shape, a flat ellipsoidal shape and the like may be used.

FIGS. 22 to 45 shows a device according to alternative embodiments of the present invention. FIGS. 22 to 29 indicate an alternative embodiment of the device, FIGS. 30 to 37 indicate another alternative embodiment of the device, and FIGS. 38 to 45 indicate still another embodiment of the device. In these alternative embodiments, like reference characters indicate identical or functionally similar elements to those in the above-mentioned embodiment.

In the alternative embodiments shown in the respective drawings, a three-dimensional shape of the grip part 3 is slightly different from that of the above-mentioned embodiment, but in either case, since the rotatability of the grip part 3 causes the grip 3 to rotate to be located at an easy-to-operate position for the individual operators and the tablet 2 to change its orientation, the operators can operate the enable switch 33 and the tablet 2 without feeling stress, thus improving operability of the device 1. Along with that, since the bottom portion 30 of the grip part 3 is sized to fit in the palm of the operator's hand, the operator can support the device 1 securely and stably. Also, in either alternative embodiment, the cable 35 interconnects between the grip part 3 and the backside end portion of the emergency stop switch 47.

Figure 43:
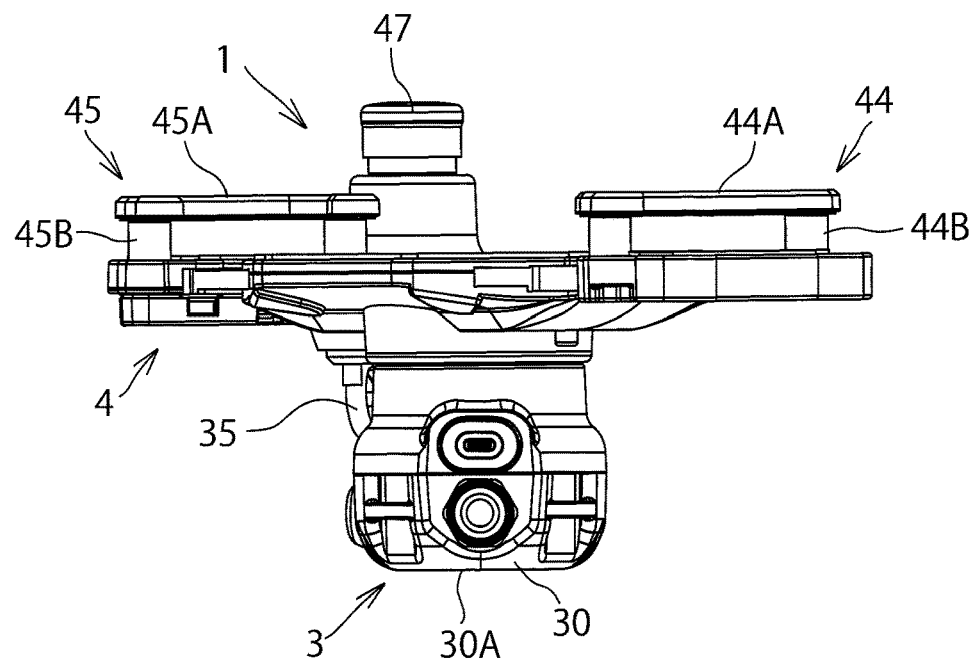
FIG. 43 is a bottom plan view of the further embodiment of the handheld device of FIG. 38.
Figure 44:
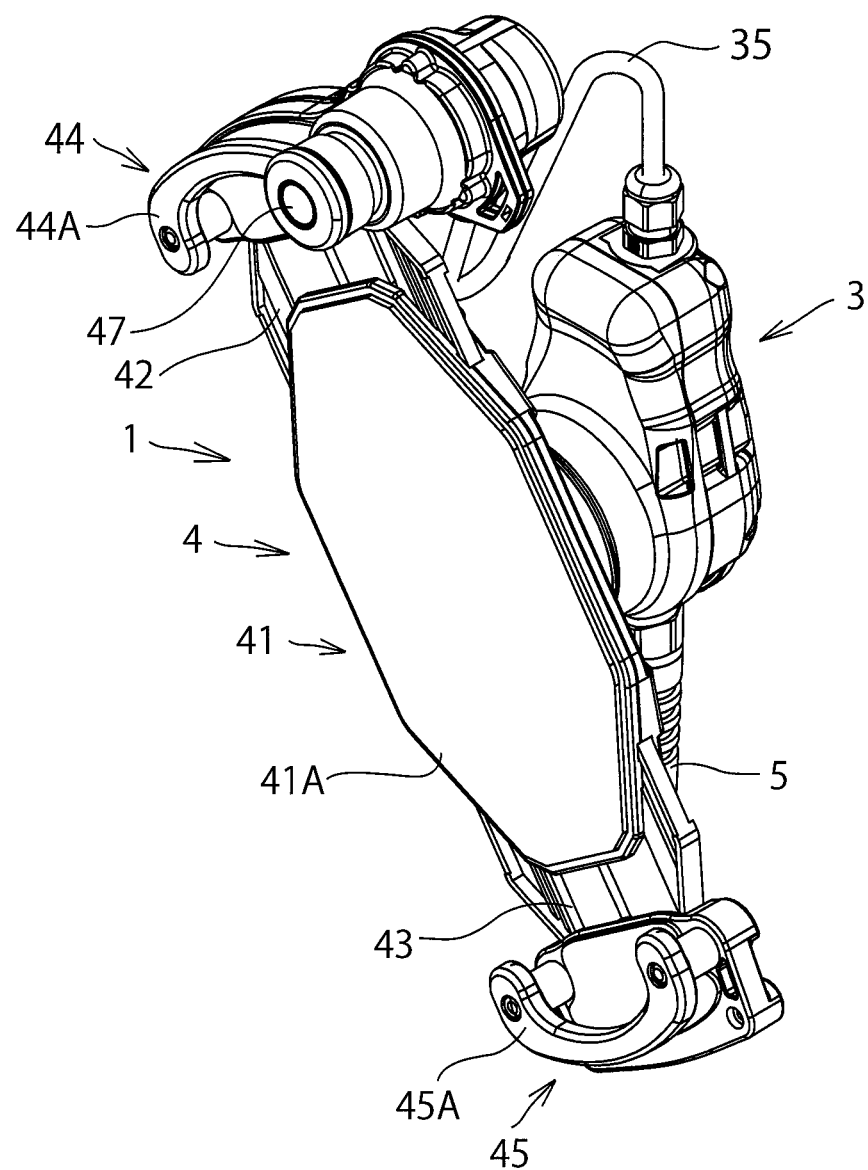
FIG. 44 is a general perspective view on the front side of the further embodiment of the handheld device of FIG. 38.
Figure 45:
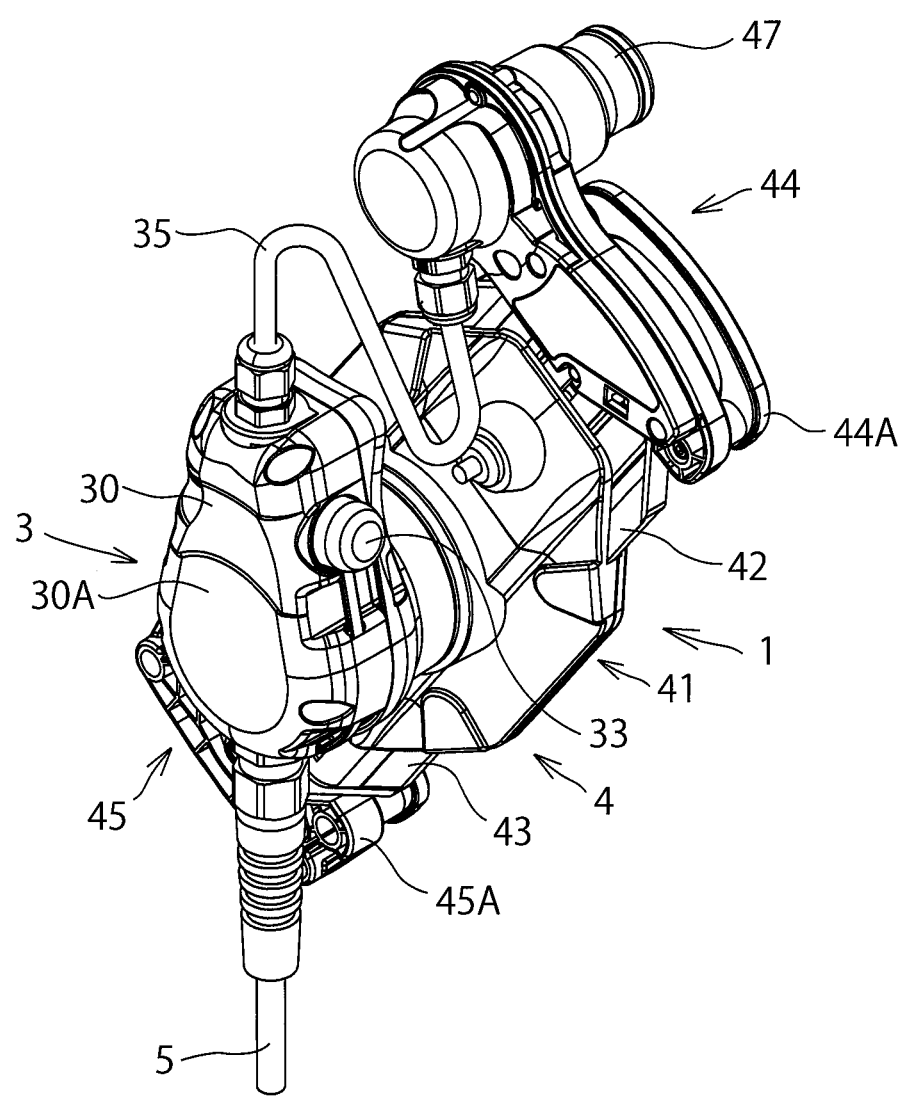
FIG. 45 is a general perspective view on the backside of the further embodiment of the handheld device of FIG. 38.

In the alternative embodiment of FIGS. 38 to 45, as shown in FIG. 43, there is provided a USB port 36 at the end portion of the grip part 3 on the side of the cable 5. The USB port 36 is for a USB feeding (or a power feeding via USB) to an attached tablet.

Also, in the alternative embodiment of FIGS. 38 to 45, the mounting position of the emergency stop switch 47 differs from the mounting positions in the above-mentioned embodiment, the alternative embodiments of FIGS. 22 to 29 and FIGS. 30 to 37.

Moreover, in the alternative embodiment of FIGS. 38 to 45, the grip part (or grasp portion) 3 extends longitudinally in a forward direction (or an upward direction in FIGS. 40 and 41) along a backside surface 41B of the holder part (or holder body) 4. The grasp portion 3 comprises an upper part 30U with a planar surface 30Up rotatably supported at the backside surface 41B of the holder body 4 through the bottom portion (or bottom part) 40, a lower part 30L located downwardly away from the upper part 30U and having a planar surface 30A disposed opposite the planar surface 30Up of the upper part 30U, and a side part 30S disposed between the upper part 30U and the lower part 30L to connect a circumferential surface 30Ls of the lower part 30L and a circumferential surface 30Us of the upper part 30U. The upper part 30U, the lower part 30L and the side part 30S respectively extend longitudinally forwardly beyond the planar surface 30Up of the upper part 30U (thus beyond the bottom part 40 of the holder body 4) along the backside surface 41B of the holder body 4. There is a clearance $e_1$ (see FIGS. 40, a 41) formed between longitudinal forward end 30Ue of the upper part 3 and the backside surface 41B of the holder body 4. The clearance $e_1$ is provided to prevent a finger of the operator from being caught between the longitudinal forward end 30Ue of the upper part 3 and the backside surface 41B of the holder body 4. Such a clearance $e_1$ (FIGS. 40, 41) is greater than a clearance $e_0$ (FIGS. 32, 33) of the corresponding parts in the alternative embodiment of FIGS. 30 to 37. Thereby, when the operator grips the grip part 30 to operate the device 1, a finger of the operator can be more securely prevented from being caught in the clearance $e_1$, which also improves an operability. Furthermore, a grasping length GL (see FIGS. 40, 41) defined by a longitudinal length of the longitudinally extending upper part 30U of the grasp portion 3 is longer than a grasping thickness GT defined by an up-down length formed of the longitudinally extending upper, lower and side parts (30U, 30L, 30S) of the grasp portion 3.

Third Alternative Embodiment

As the tablet 2 in the above-mentioned embodiment, not only a dedicated tablet, a dedicated touch panel, a dedicated operation panel or the like for the device 1 is used, but also a smart device such as a smartphone, a tablet personal computer or the like aside from a commercially available tablet may be used. As described above, since the respective engagement portions 44, 45 to sandwich the tablet 2 is so structured as to change the distance therebetween, the device 1 can be applicable for the tablet 2 of various sizes.

Figure 46:
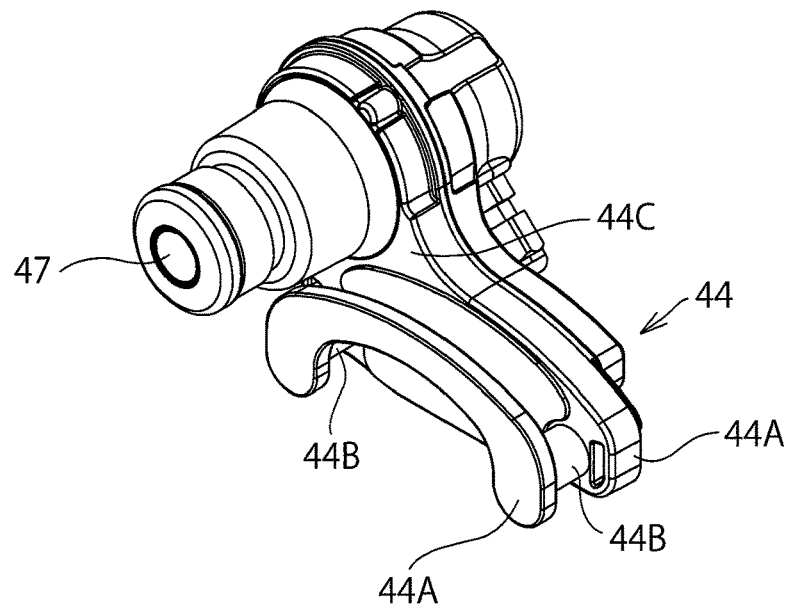
FIG. 46 is a perspective view of one engagement portion removed from the handheld device of FIG. 28.
Figure 46A:
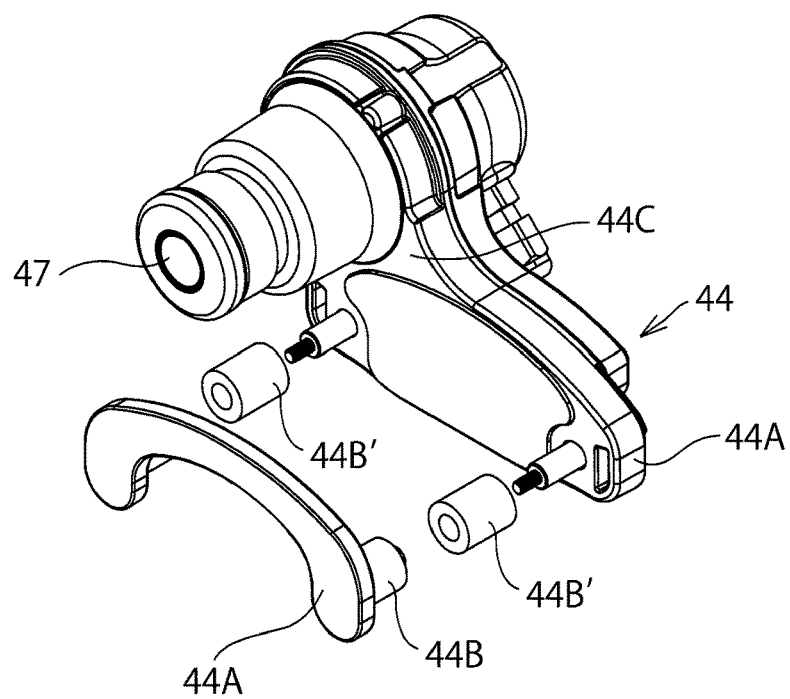
FIG. 46A is a blown-up perspective view of the engagement portion of FIG. 46, illustrating the state in the middle of a change of the distance between the respective arm parts of the engagement portion.
Figure 46B:
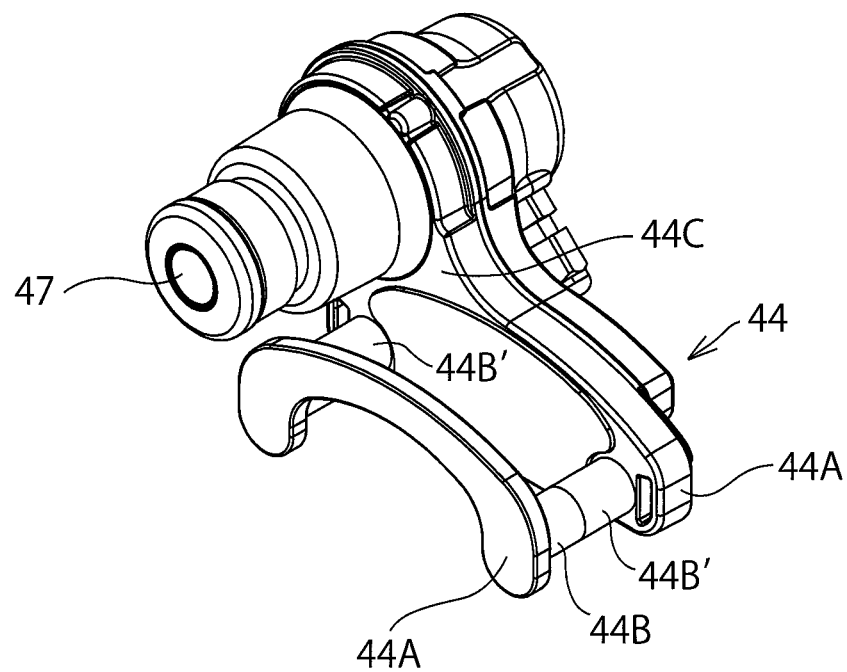
FIG. 46B is a perspective view of the engagement portion of FIG. 46, illustrating the state after the change of the distance between the respective arm parts of the engagement portion.

Also, the respective engagement portions 44, 45 may be applicable for the tablet 2 of different thicknesses. FIGS. 46 to 46B illustrate an example of such an engagement portion. In the respective drawings, only the engagement portion 44 is shown, but a similar structure is applicable for the engagement portion 45.

Figure 28:
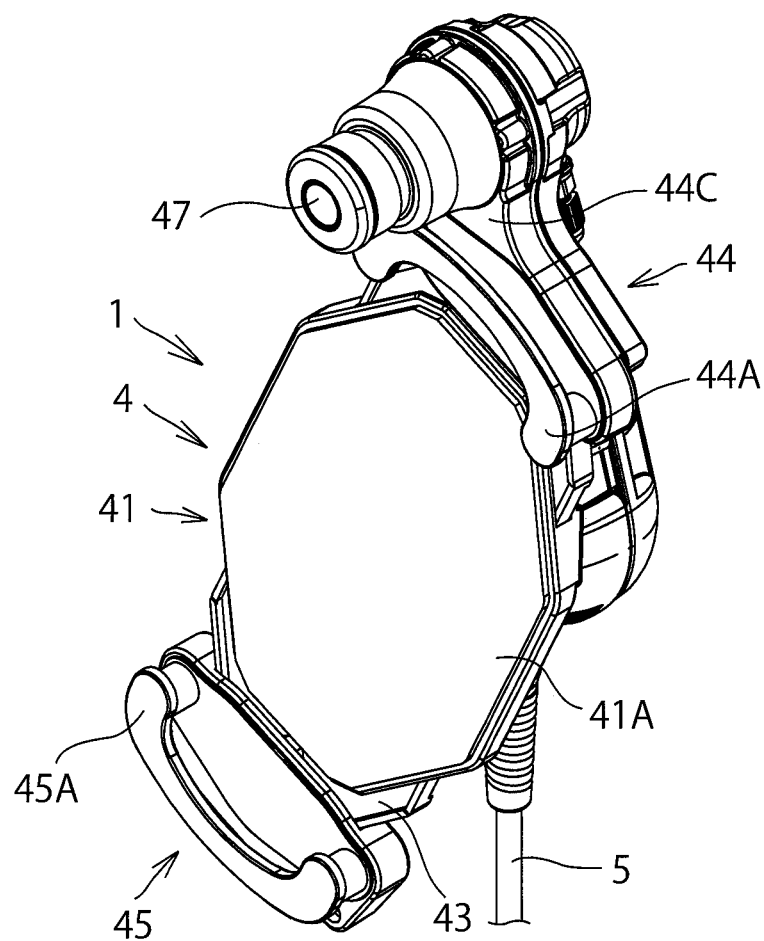
FIG. 28 is a general perspective view on the front side of another embodiment of the handheld device of FIG. 22.
Figure 29:
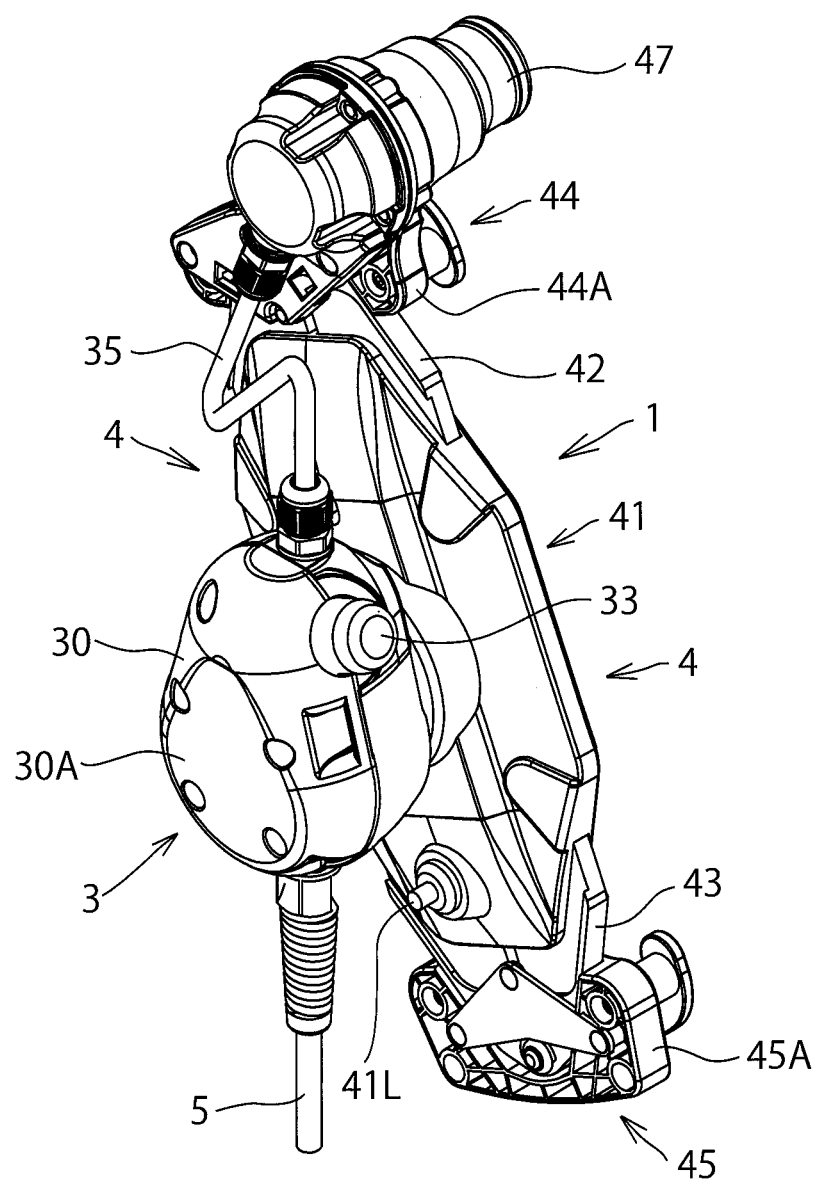
FIG. 29 is a general perspective view on the backside of another embodiment of the handheld device of FIG. 22.
Figure 30:
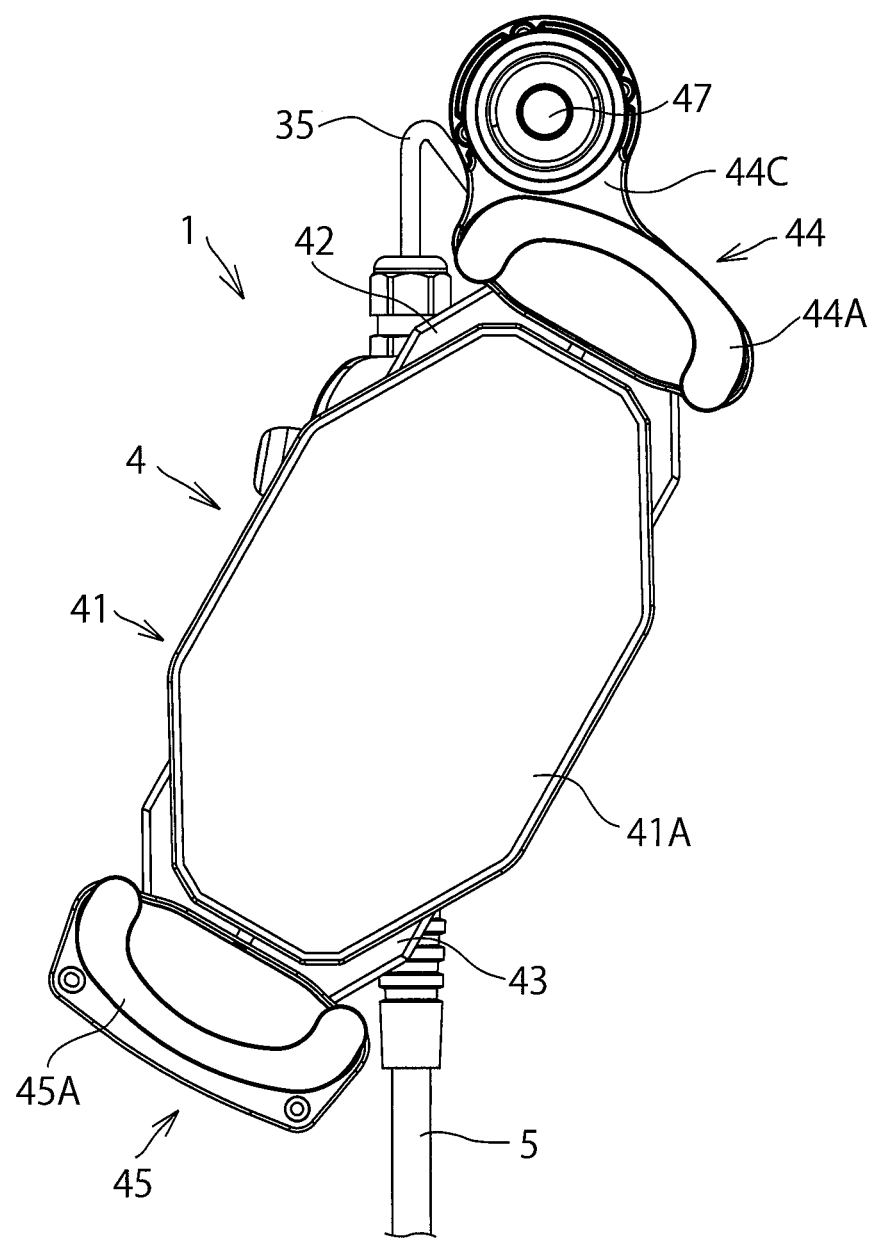
FIG. 30 is a front elevational view of still another embodiment of the handheld device (but, tablet is omitted) of FIG. 1.
Figure 31:
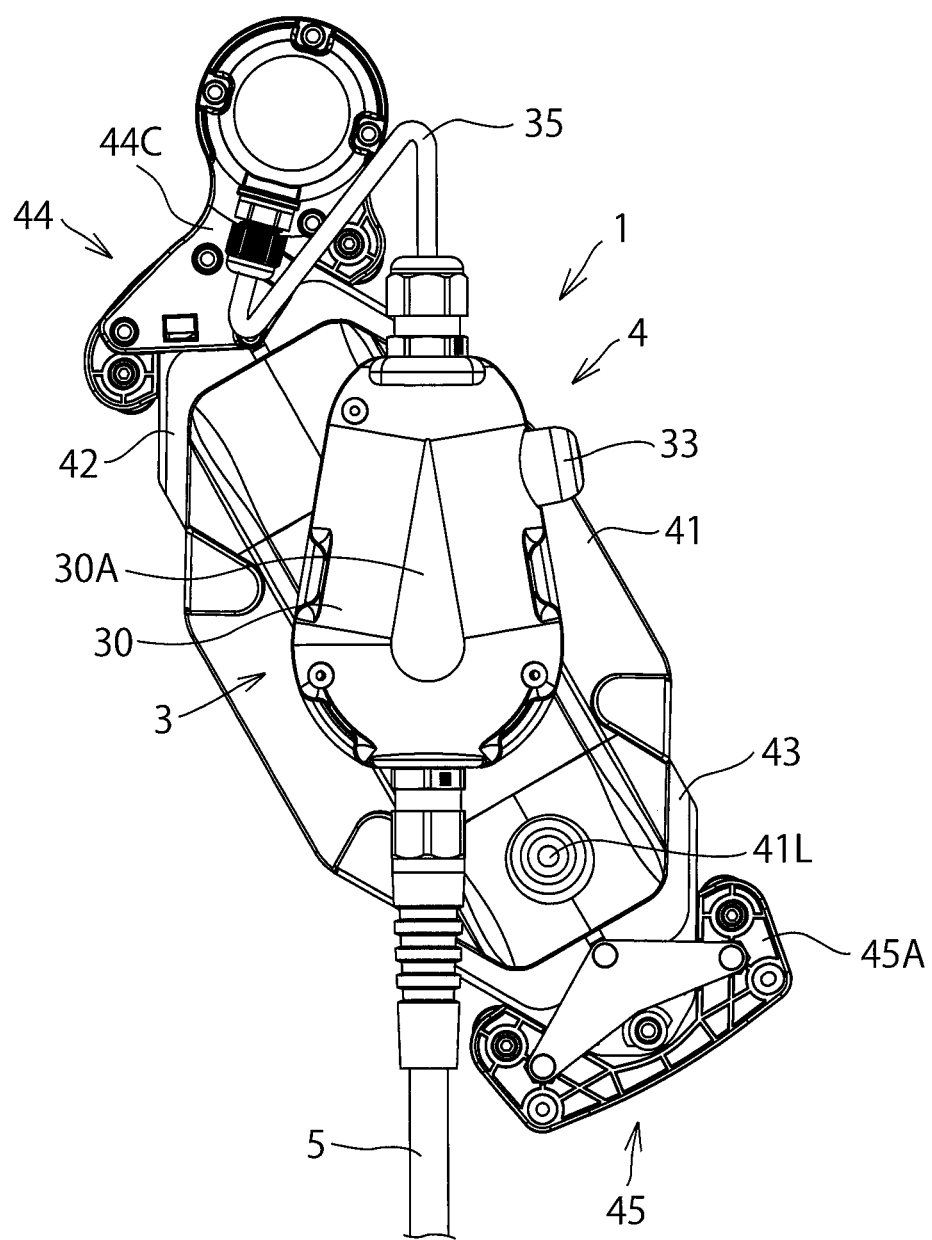
FIG. 31 is a back elevational view of still another embodiment of the handheld device of FIG. 30.
Figure 32:
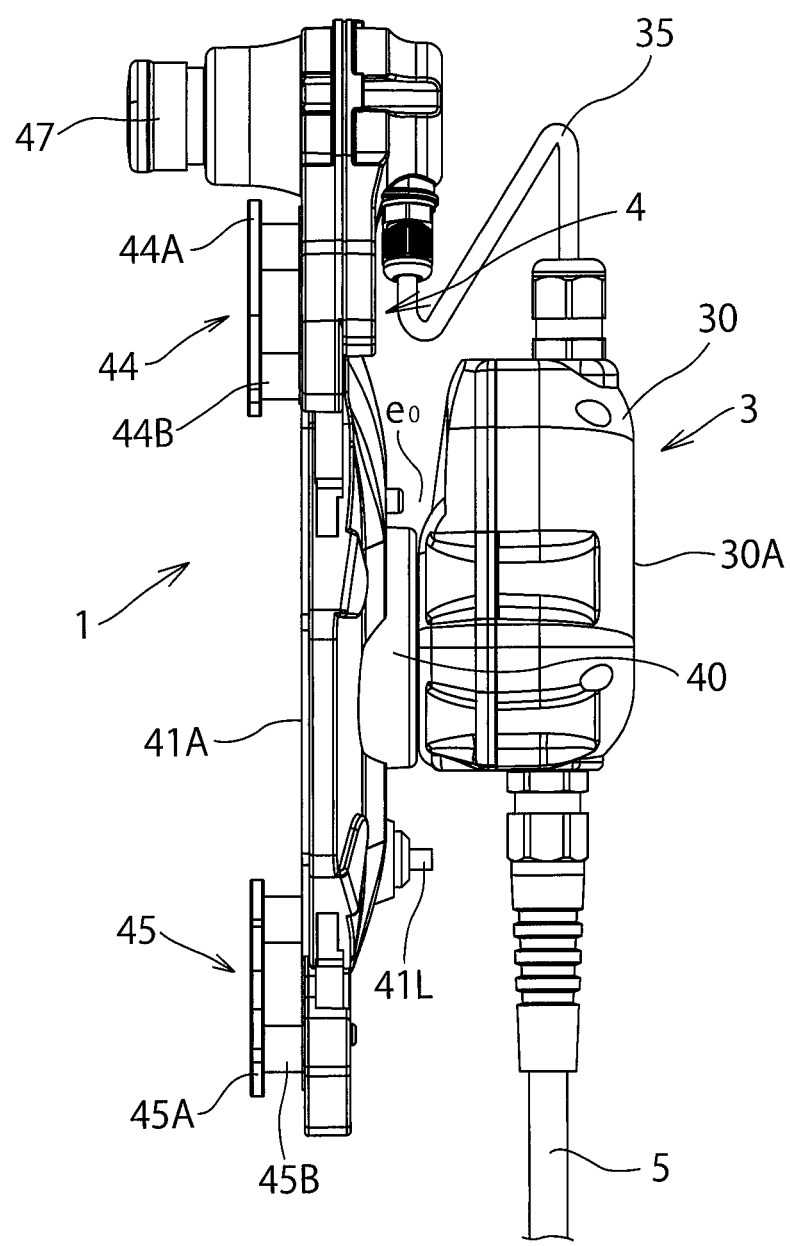
FIG. 32 is a right-side view of still another embodiment of the handheld device of FIG. 30.
Figure 33:
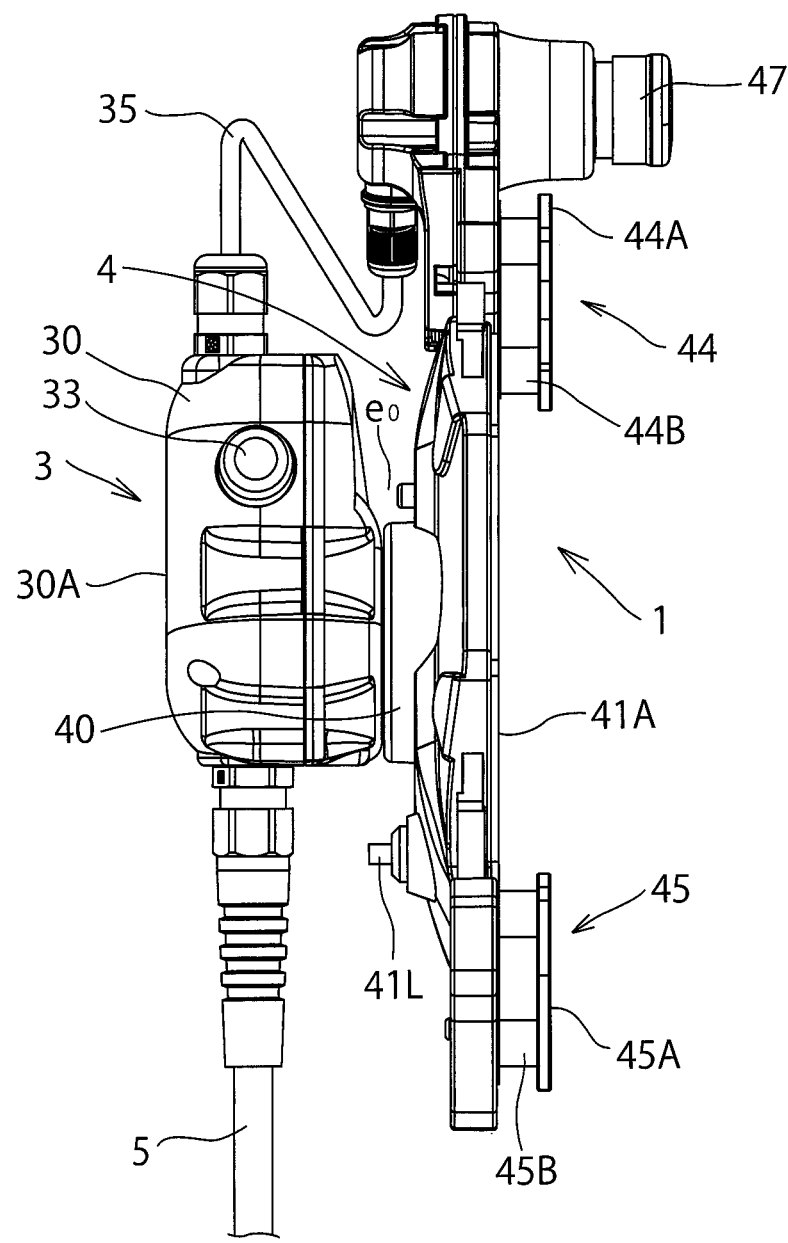
FIG. 33 is a left-side view of still another embodiment of the handheld device of FIG. 30.
Figure 34:
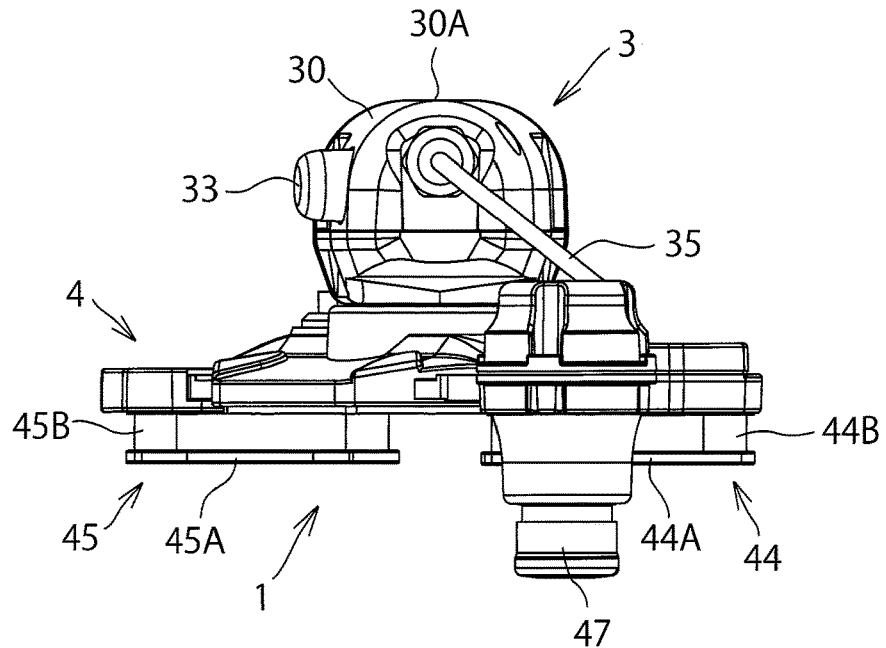
FIG. 34 is a top plan view of still another embodiment of the handheld device of FIG. 30.
Figure 35:
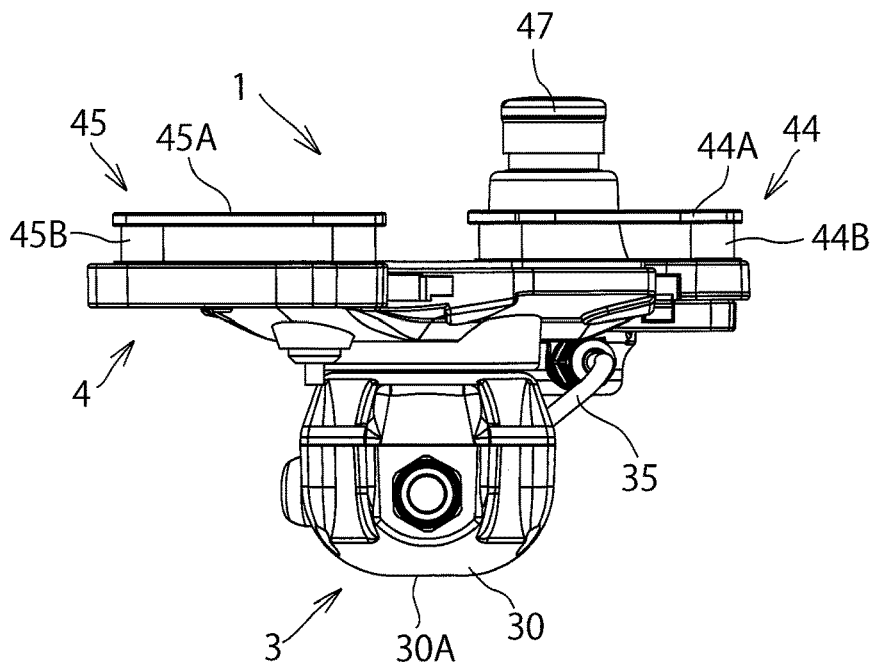
FIG. 35 is a bottom plan view of still another embodiment of the handheld device of FIG. 30.
Figure 36:
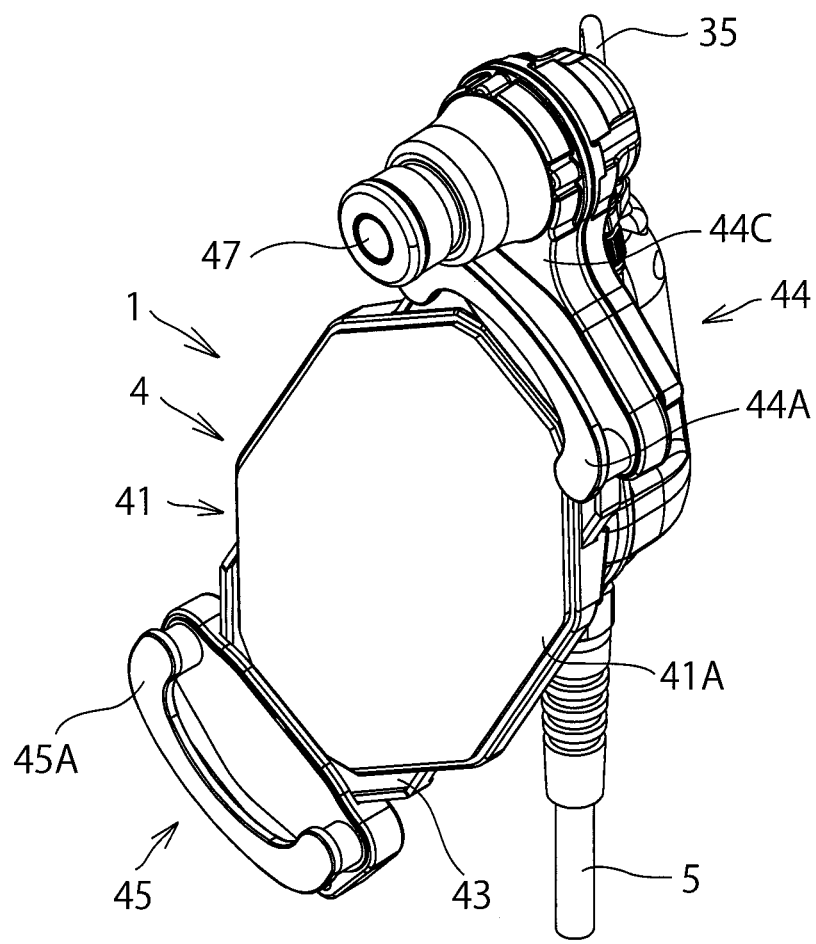
FIG. 36 is a general perspective view on the front side of still another embodiment of the handheld device of FIG. 30.
Figure 37:
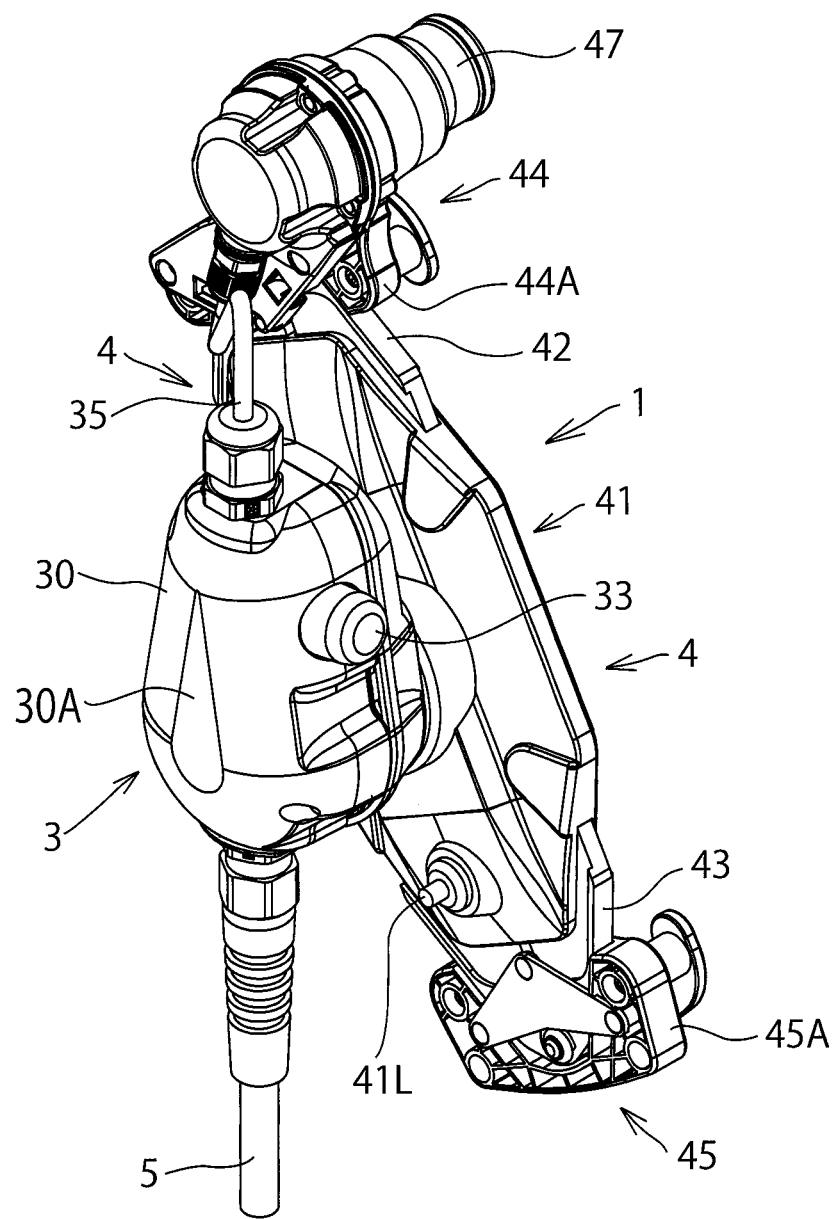
FIG. 37 is a general perspective view on the backside of still another embodiment of the handheld device of FIG. 30.
Figure 38:
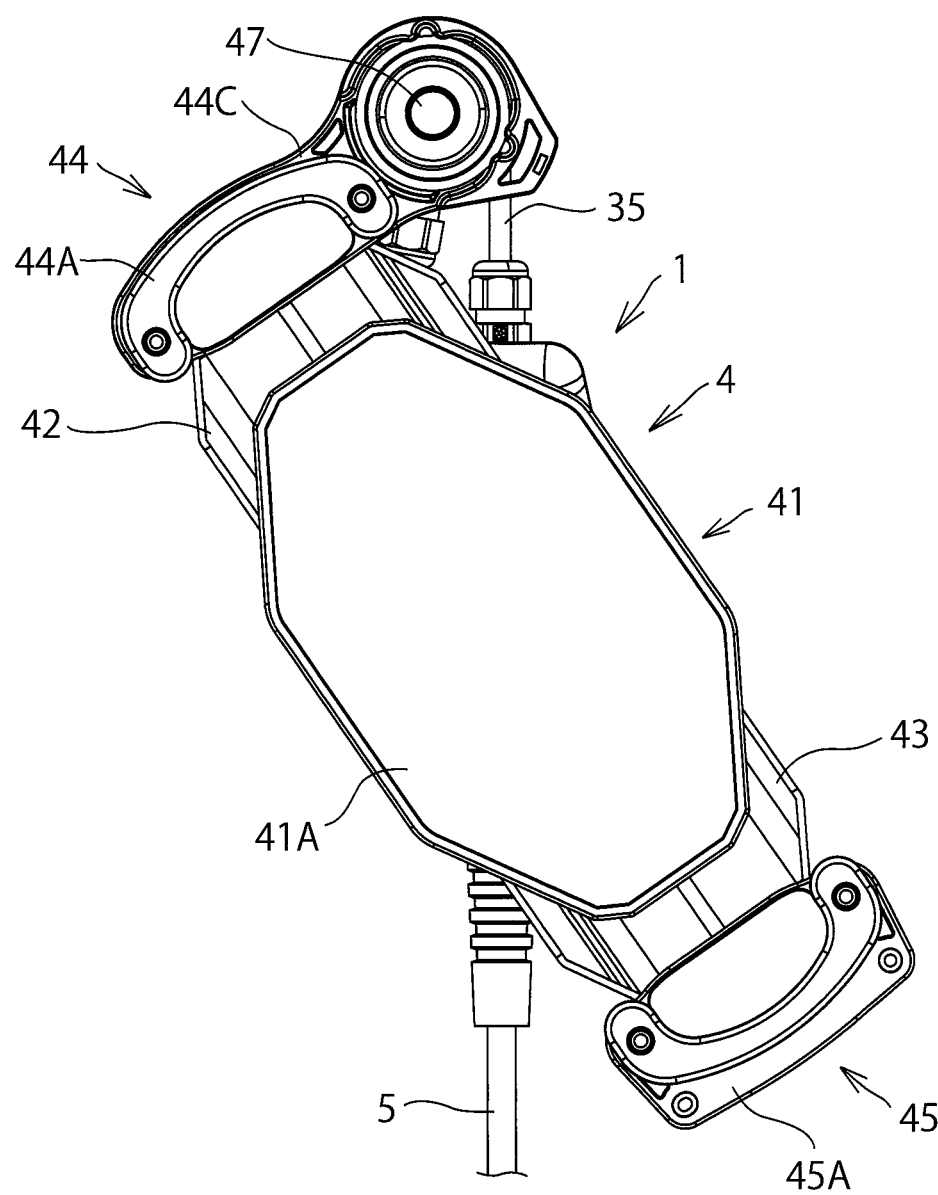
FIG. 38 is a front elevational view of a further embodiment of the handheld device (but, tablet is omitted) of FIG. 1.
Figure 39:
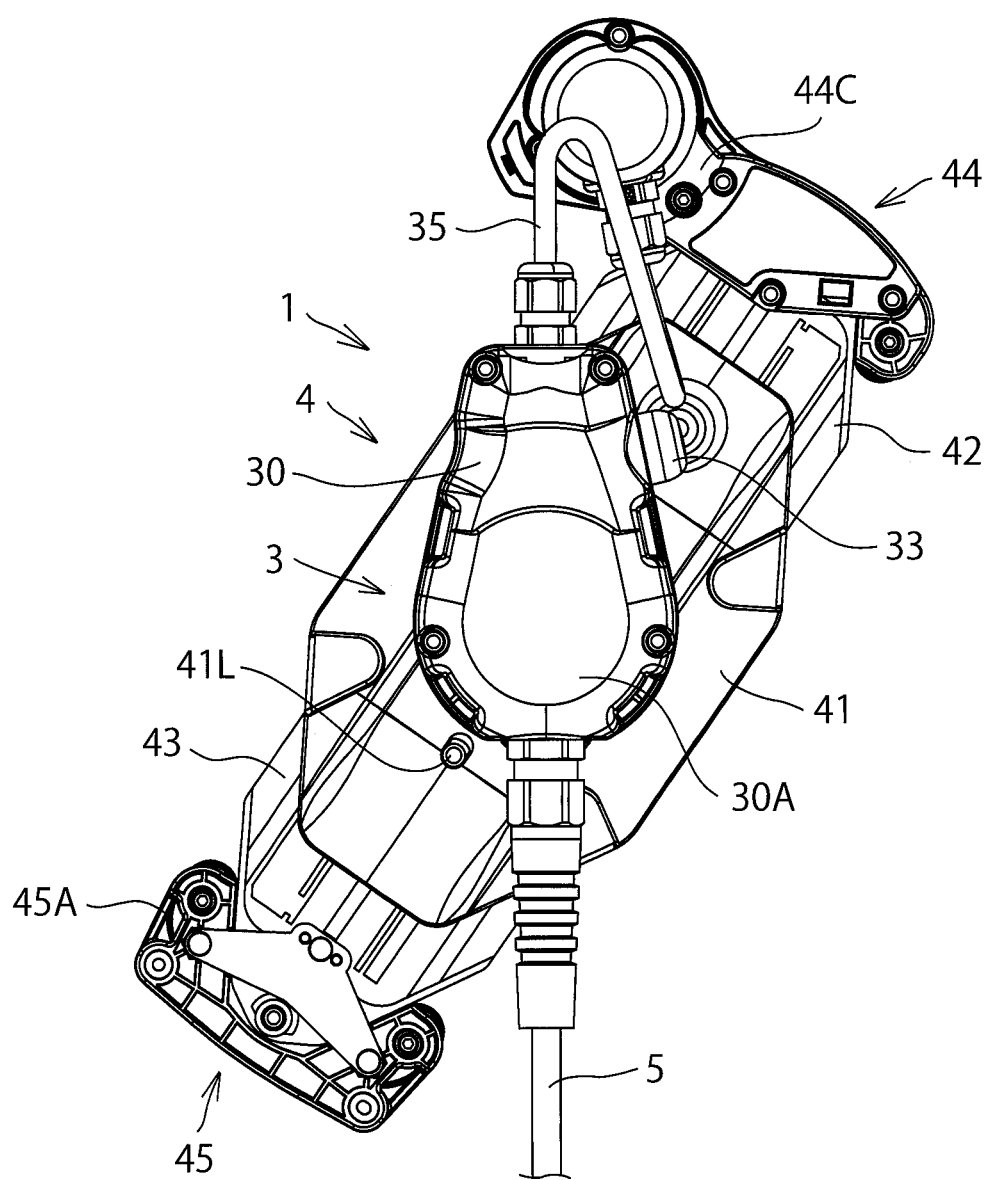
FIG. 39 is a back elevational view of the further embodiment of the handheld device of FIG. 38.
Figure 40:
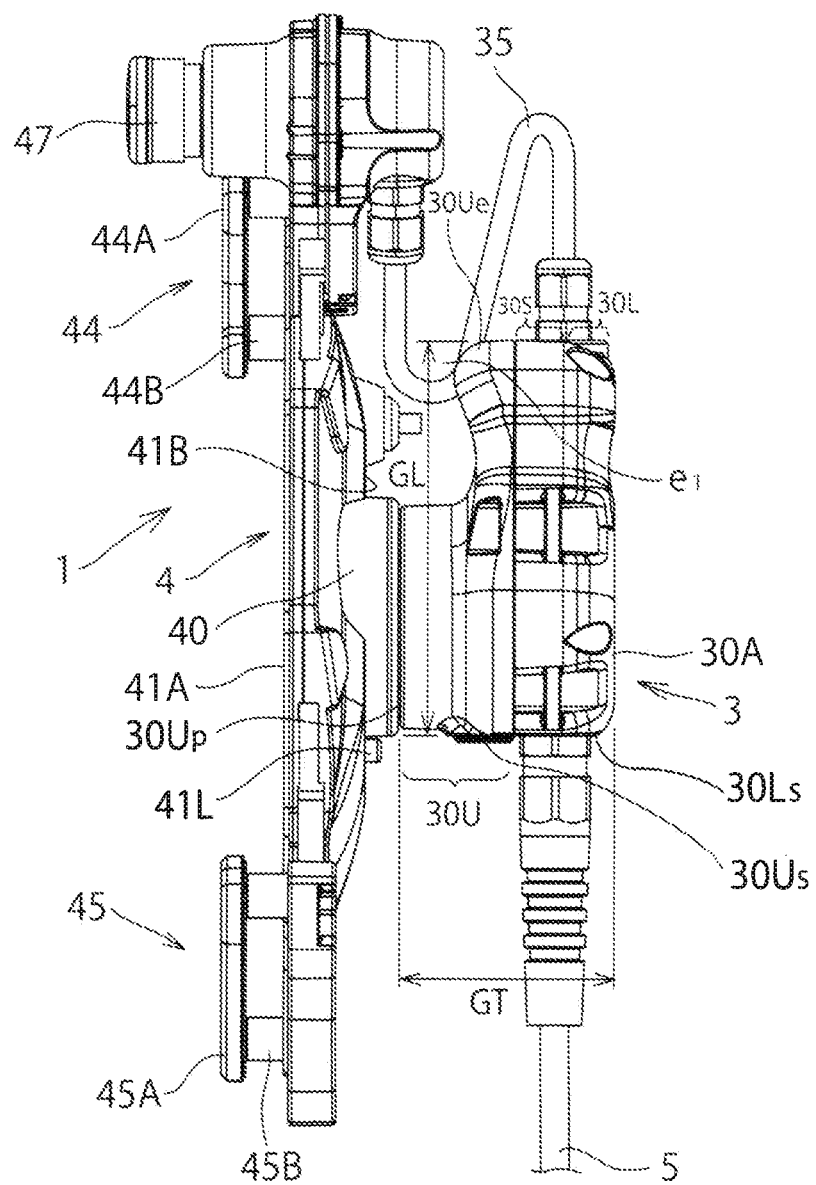
FIG. 40 is a right-side view of the further embodiment of the handheld device of FIG. 38.
Figure 41:
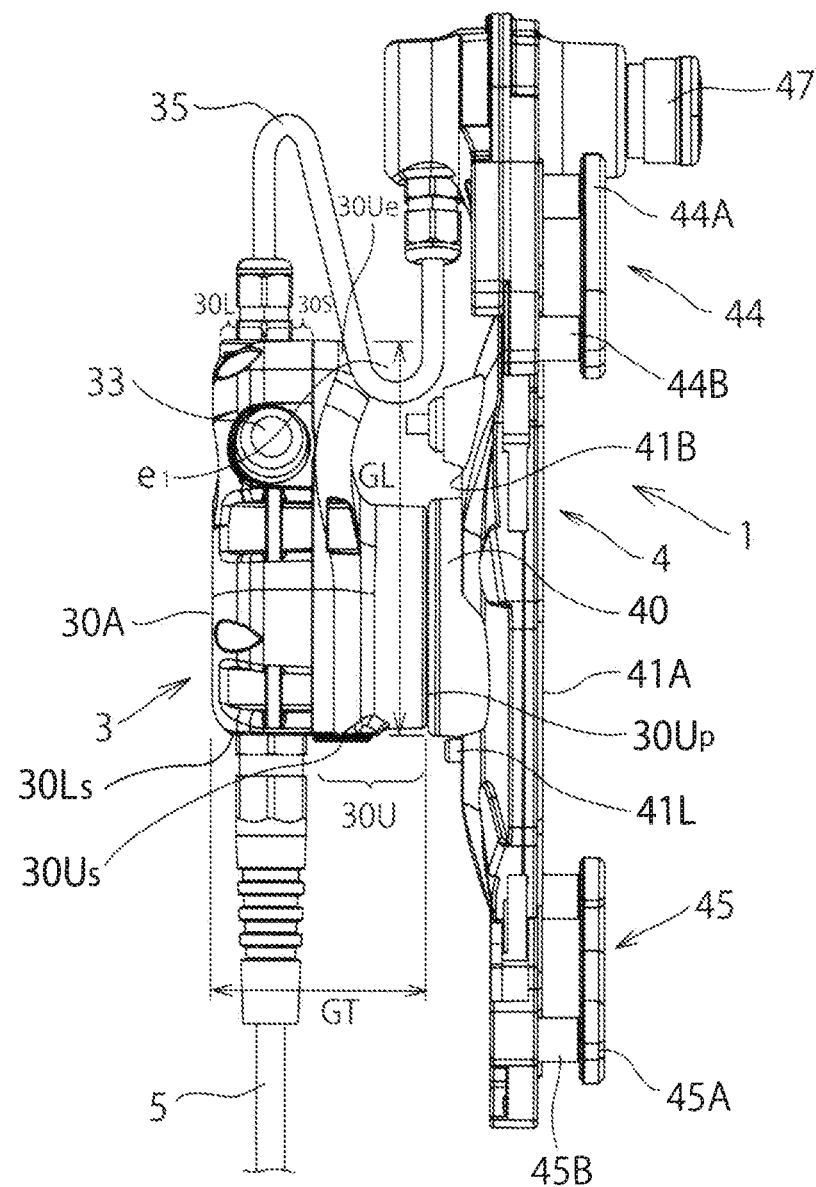
FIG. 41 is a left-side view of the further embodiment of the handheld device of FIG. 38.
Figure 42:
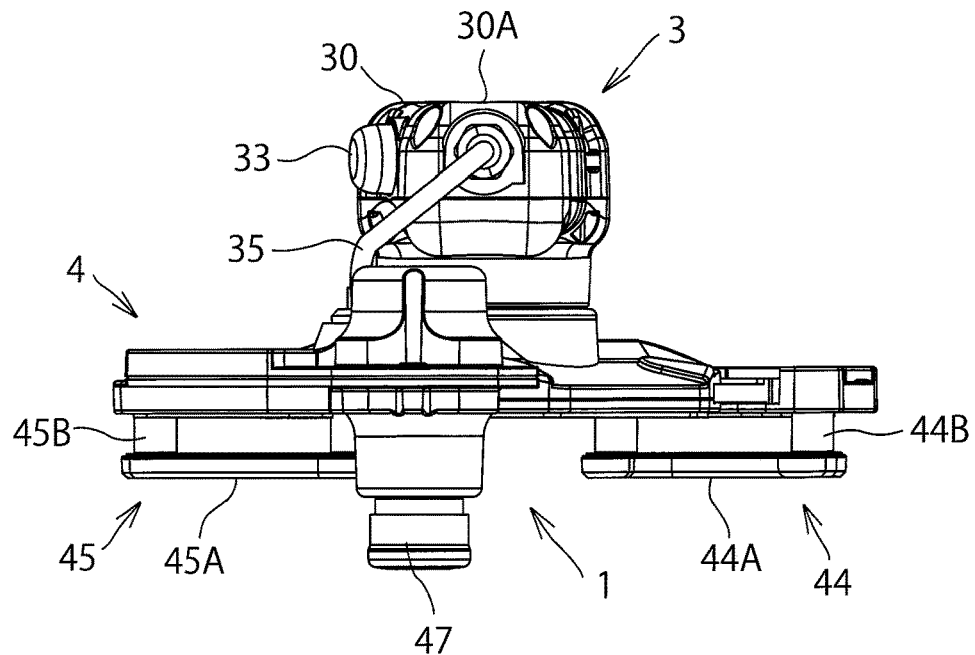
FIG. 42 is a top plan view of the further embodiment of the handheld device of FIG. 38.

FIG. 46 shows the engagement portion 44 that is taken out of the device 1 of for example FIG. 28. As shown in FIG. 46, the engagement portion 44 includes a pair of arm portions 44A disposed opposite each other via a distance therebetween and a pair of cylindrical spacers 44B disposed between and interconnect the respective arm portions 44A. The respective spacers 44B is fixed to the respective arm portions 44A by for example screwing. From this state, as shown in FIG. 46A, the engaged state between the respective spacers 44B and one of the arm portions 44A is disengaged, new spacers 44B' are disposed between the respective spacers 44B and the one of the arm portions 44A, and the respective arm portions 44A are interconnected to each other through the spacers 44B, 44B'. Thereby, as shown in FIG. 46B, the distance between the respective portions 44A is enlarged to be applicable for a thicker tablet. Also, if a spacer of various kinds of different lengths are prepared as the spacer 44B', the engagement portion 44 can be applicable to a tablet of various thicknesses. In addition, here, an example was shown in which by adding the new spacers 44B' to the standard specification spacer 44B used at the engagement portion 44, the distance between the respective arm portions 44A was changed, but in changing the distance between the respective arm portions 44A, the standard specification spacers 44B may be replaced by a different spacer of different lengths.

Fourth Alternative Embodiment

In the above-mentioned embodiment, as shown in FIG. 3, the engagement portion 44 was disposed at the top right corner portion of the tablet 2 and the engagement portion 45 was disposed at the bottom left corner portion of the tablet 2 as viewed from the front side of the tablet 2, but the application of the present invention is not restricted to such an example.

Figure 47:
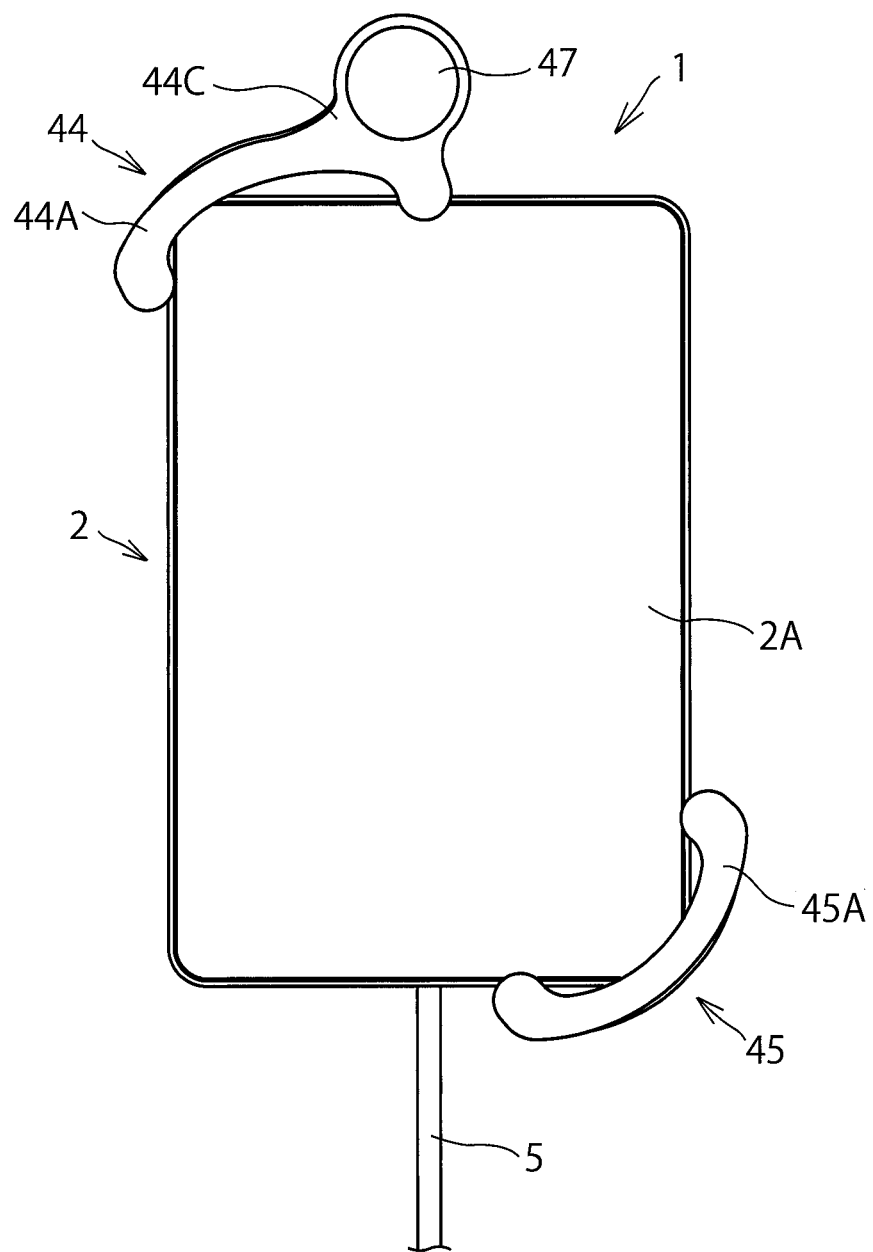
FIG. 47 shows an alternative embodiment of the handheld device.

As shown in FIG. 47, the engagement portion 44 is disposed at the top left corner portion of the tablet 2 and the engagement portion 45 is disposed at the bottom right corner portion of the tablet 2. In general, as for the layout of the buttons of the tablet, an operation button such as a power button (and an unlock button), a volume button and the like is disposed at the upper right of tablet 2, as viewed from the front side of the tablet 2. Therefore, by arranging the engagement portions 44, 45 at such a layout as shown in FIG. 47, the operator can perform the operation of the operation button of the tablet in a smoother manner.

Also, in the example shown in FIG. 47, the emergency stop switch 47 fitted to the engagement portion 44 is disposed on the right side of the engagement portion 44 unlike the above-mentioned embodiment as viewed from the front side, more preferably, in the upper center of the tablet 2. In this case, when the operator grips the grip part (not shown) on the back side of the tablet 2 with one hand and operates the emergency stop switch 47 with the other hand, the operator can operate the emergency stop switch 47 with his/her dominant hand thus improving the operability of the emergency stop switch 47.

Figure 47A:
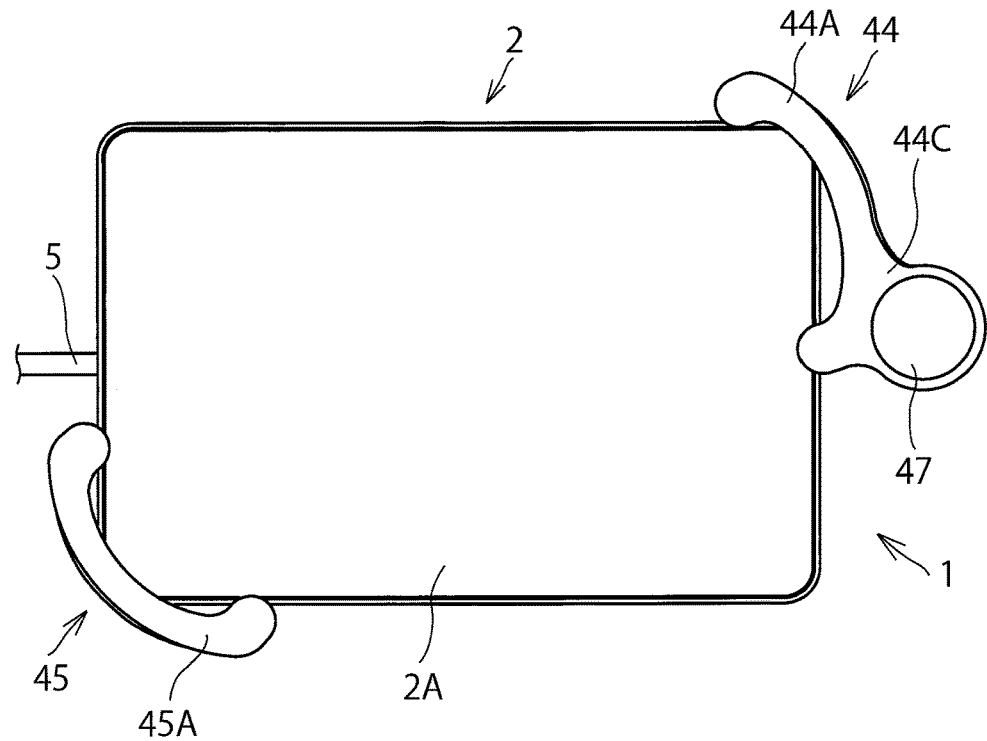
FIG. 47A shows the state in which the handheld device of FIG. 47 is disposed sideways (rotated in the clockwise direction by 90 degrees)
Figure 47B:
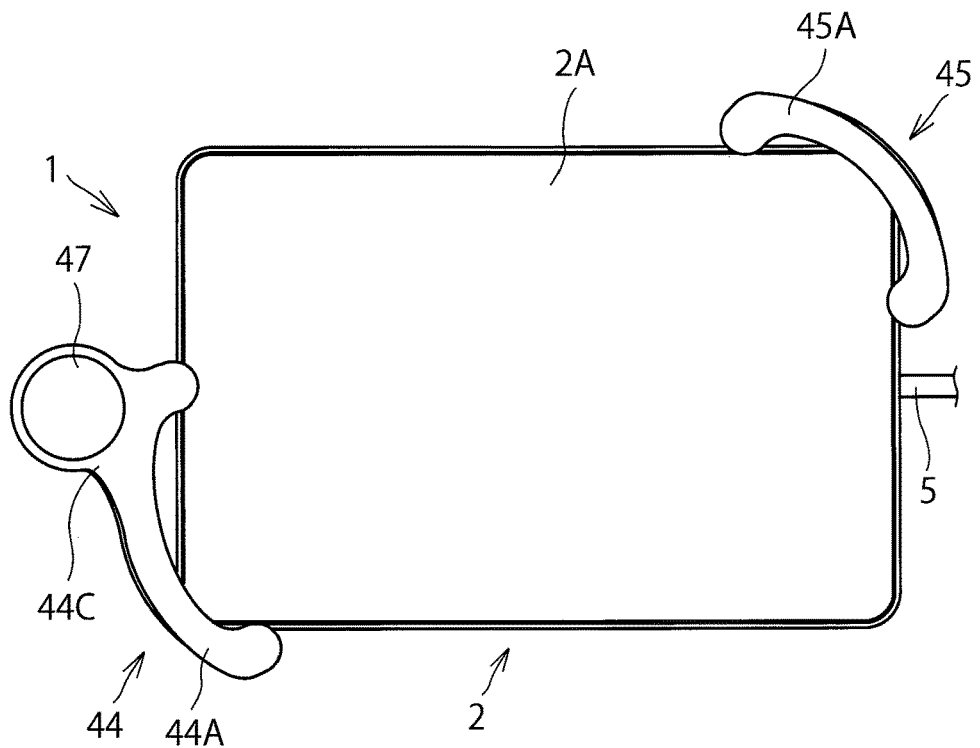
FIG. 47B shows the state in which the handheld device of FIG. 47 is disposed sideways (rotated in the counterclockwise direction by 90 degrees)

FIGS. 47A and 47B show the state in which the tablet 2 is disposed sideways. The disposition shown in FIG. 47A is suitable for an operator whose dominant hand is a right hand, and the disposition shown in FIG. 47B is suitable for an operator whose dominant hand is a left hand. In the example shown in FIG. 47A, since the emergency stop switch 47 is disposed on the right side of the operator with the grip part gripped by his/her left hand, the operator can operate the emergency stop switch 47 with his/her dominant hand or right hand, thus enhancing the operability of the emergency stop switch 47. In the example shown in FIG. 47B, since the emergency stop switch 47 is disposed on the left side of the operator with the grip part gripped by his/her right hand, the operator can operate the emergency stop switch 47 with his/her dominant hand or left hand, thus enhancing the operability of the emergency stop switch 47.

Fifth Alternative Embodiment

In the above-mentioned embodiment, an example was shown in which the enable switch 33 is provided at the grip part 3 and the emergency stop switch 47 is proved at the engagement portion 44, but either one of the enable switch 33 and the emergency stop switch 47 can be omitted.

Sixth Alternative Embodiment

In the above-mentioned embodiment, an example was shown in which the enable switch 33 is wire-connected to the controller RC through the cable 5 and the emergency stop switch 47 is wire-connected to the controller RC through the cable 6 (see FIG. 21), but the application of the present invention is not restricted to such an example.

Figure 48:
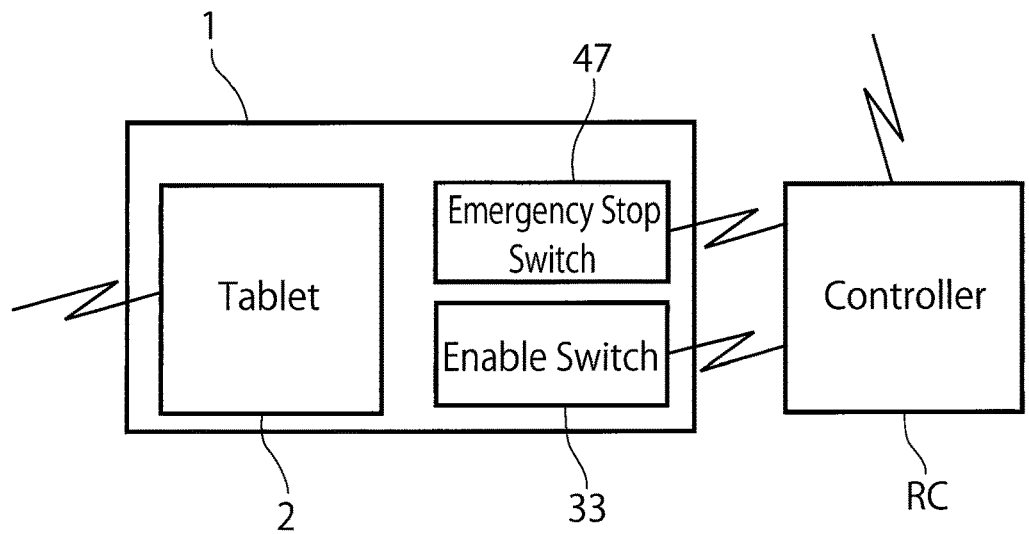
FIG. 48 is a schematic block diagram of a first variant of FIG. 21.
Figure 49:
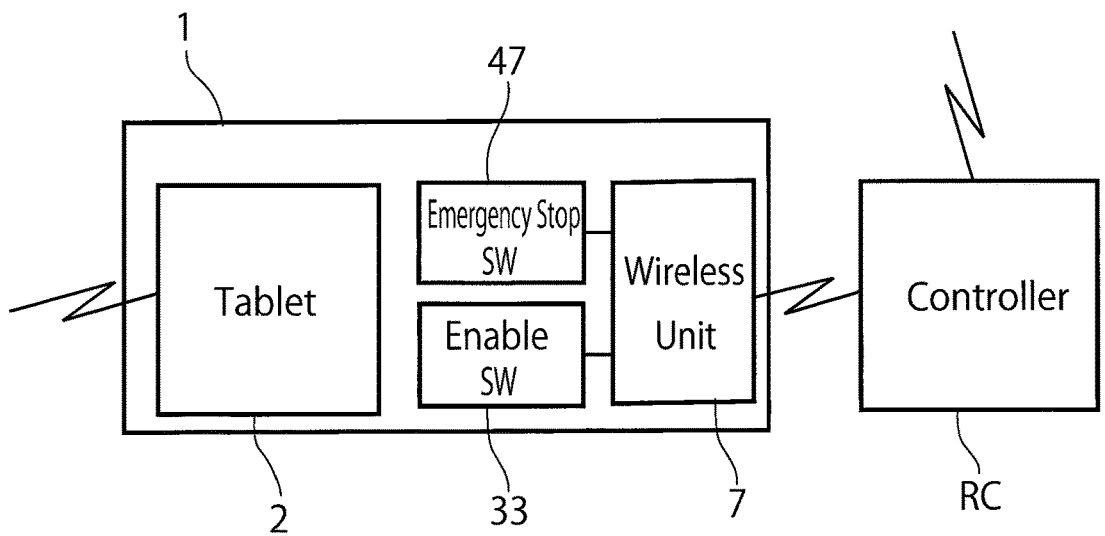
FIG. 49 is a schematic block diagram of a second variant of FIG. 21.

FIGS. 48 and 49 respectively show a variant of a first and second alternative embodiment of FIG. 21. In the first variant shown in FIG. 48, the enable switch 33 and the emergency stop switch 47 respectively have a built-in wireless module, which are wireless-connected to the controller RC. In the second variant shown in FIG. 49, the enable switch 33 and the emergency stop switch 47 are connected to a wireless unit 7 and further wireless-connected to the controller RC through the wireless unit 7.

In addition, as for the types of radio or wireless, there are, for instance, a Wi-Fi communication, a BLUETOOTH communication, ZIGBEE communication, BLE (Bluetooth Low Energy) communication, WiMax communication, infrared communication and the like.

Seventh Alternative Embodiment

In the above-mentioned embodiment, an example was shown in which the emergency stop switch 47 was fitted to the flange portion 44C of the engagement portion 44 (see FIG. 1), but the application of the current invention is not limited to such an example.

Figure 50:
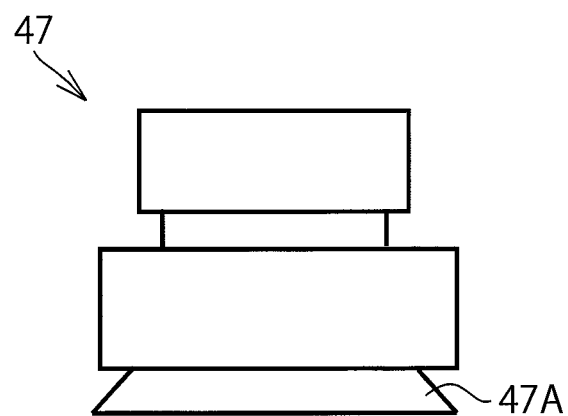
FIG. 50 shows a first alternative embodiment of the emergency stop switch provided at the handheld device of FIG. 1.
Figure 51:
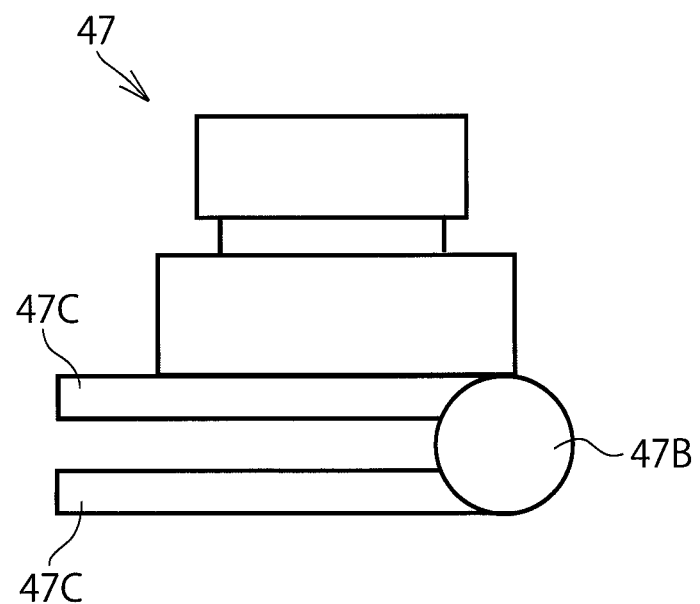
FIG. 51 shows a second alternative embodiment of the emergency stop switch provided at the handheld device of FIG. 1.

FIGS. 50 and 51 respectively show a first and second variant of the emergency stop switch 47. In the first variant shown in FIG. 50, the emergency stop switch 47 has a sucking disk 47A fitted to the lower portion thereof. The emergency stop switch 47 can be installed at an arbitrary position of the device 1, such as at any position on the screen 2A of the tablet 2, through the sucking disk 47A. In the second variant shown in FIG. 51, the emergency stop switch 47 has a pair of openable and closable clip members 47C fitted to the lower portion thereof, which is supported rotatably by a support shaft 47B. The emergency stop switch 47 can be installed at an arbitrary position of the device 1, for example, at any position of the end surface of the tablet 2, so as to vertically sandwich the end surface by opening and closing the respective clip members 47C, thus improving the operability of the emergency stop switch 47. Also, in the case when the emergency stop switch 47 is not needed, the emergency stop switch 47 can be removed from the device 1 thus coping with various applications.

Figure 51A:
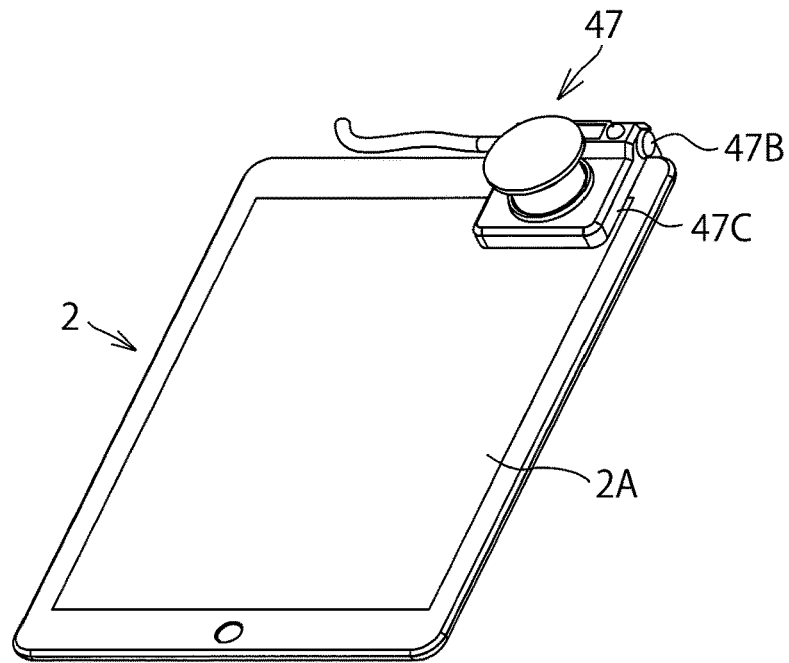
FIG. 51A is a perspective view of the handheld device, illustrating the state in which the emergency stop switch of FIG. 51 is fitted to the extreme right of the upper end of the tablet.
Figure 51B:
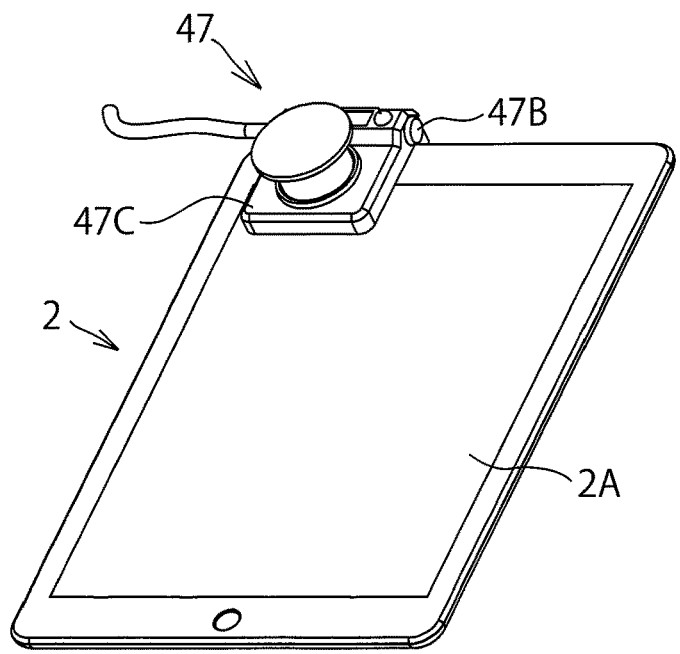
FIG. 51B is a perspective view of the handheld device, illustrating the state in which the emergency stop switch of FIG. 51 is fitted to the extreme left of the upper end of the tablet.

FIGS. 51A and 51B show the state in which the emergency stop switch 47 shown in FIG. 51 is detachably fitted to the tablet 2. In the respective drawings, for illustrating purposes, the holder part 4 and the engagement portions 44, 45 are omitted. As shown in these drawings, the emergency stop switch 47 is disposed at one end portion (in this example, upper end portion) of the tablet 2, the respective clip members 47C sandwich the end portion of the tablet 2 in the vertical direction (or the thickness direction of the tablet 2), and the clip members 47C are detachably fitted to the end portion. The emergency stop switch 47 can be disposed at an arbitrary position on the end portion, that is, not only at the right end position shown in FIG. 51A and the left end position shown in FIG. 51B but also at the central position.

Eighth Alternative Embodiment

Figure 52:
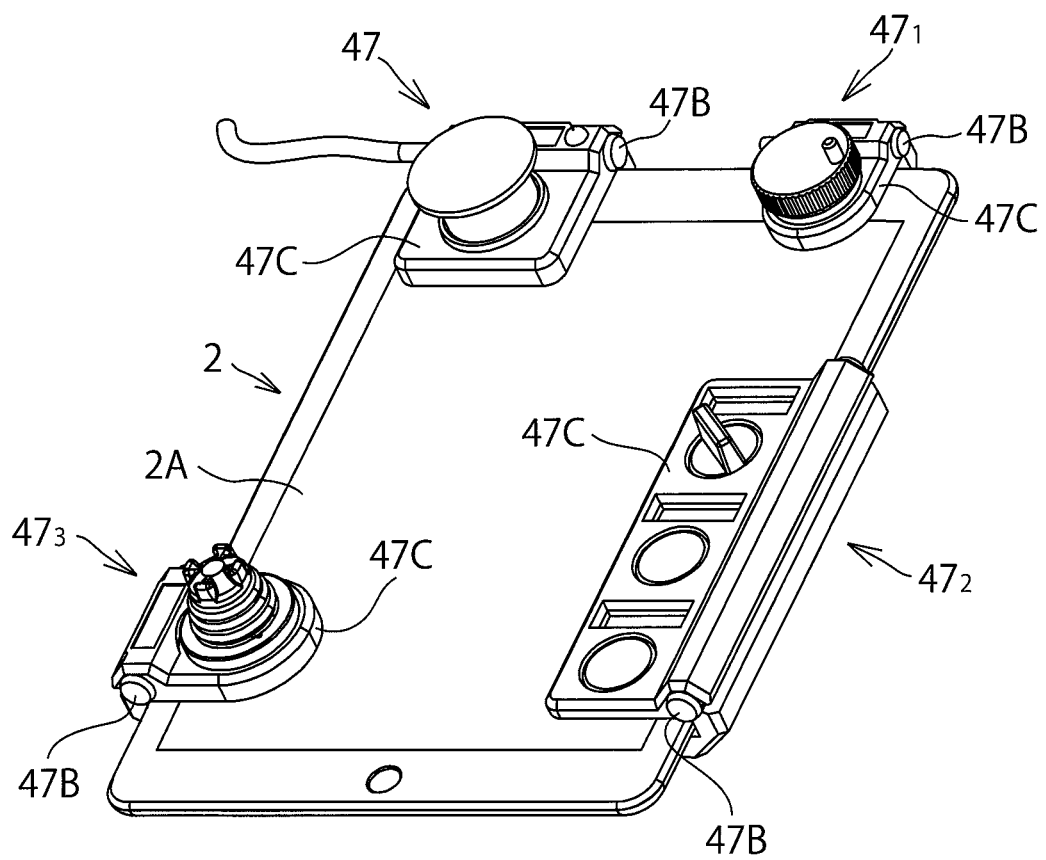
FIG. 52 is a perspective view of the handheld device, illustrating the state in which a pulse generator unit, a switch unit and a joystick in addition to the emergency stop switch of FIG. 51 are detachably fitted to the tablet.

FIG. 52 shows the state in which for example a pulse generator unit $47_1$, a switch unit $47_2$ and a joystick $47_3$ in addition to the emergency stop switch 47 are detachably fitted to the tablet 2. As shown in FIG. 52, the pulse generator unit $47_1$, the switch unit $47_2$ and the joystick $47_3$ respectively have a pair of clip members 47C similar to the emergency stop switch 47 for a detachable installation at an arbitrary position of either of the end portions of the tablet 2, and are fitted to the end portion of the tablet 2 by vertically sandwiching the end portion. The pulse generator unit $47_1$, the switch unit $47_2$ and the joystick $47_3$ are electrically connected to the tablet 2 and the device 1.

By fitting these switches to the tablet 2, an additional operational function relative to the tablet 2 and the device 1 can be simply added, and an input operation such as a setting change and an operation of the tablet 2 and the device 1 can be conducted through these switches, thus improving operability. In addition, a push button and a selector switch other than the above-mentioned switches may be detachably attached to the tablet 2 through a similar clip member. Also, as a method for detachably fitting the various switches to the tablet 2, aside from the above-mentioned clip members, a sucking disk (FIG. 50), a hook-and-loop fastener, a double coated tape and the like may be used.

Ninth Alternative Embodiment

In the above-mentioned embodiment, an example was shown in which tablet 2 was engaged in the diagonal direction through the holder part 4. The direction for engaging the tablet 2 is not restricted to the diagonal direction, but it may be an opposite side direction. That is, a pair of opposing short sides or long sides of the tablet 2 may be engaged.

Tenth Alternative Embodiment

In the above-mentioned embodiment, the tablet 2 that outputs a signal to the controller RC of the robot was taken as an example of the body 2 supported by the holder part 4, but the application of the present invention is not restricted to such an example. The body according to the present invention includes various handheld manual-operating devices such as a teaching pendant, a handheld bar code reading device, a hand-operating manual pulse generator unit, a handheld controller and so on.

Eleventh Alternative Embodiment

In the above-mentioned embodiment, an example was shown in which the tablet 2 is supported by the holder part 4 and the grip part 3 is provided at the bottom portion 40 of the holder part 4, but the holder part 4 can be omitted. For example, the holder part may be directly provided at the back side surface of a teaching pendant.

Other Alternative Embodiment

The above-mentioned embodiment and the respective alternative embodiments should be considered in all respects only as illustrative and not restrictive. Those skilled in the art to which the invention pertains may make modifications and other embodiments employing the principles of this invention without departing from its spirit or essential characteristics particularly upon considering the foregoing teachings, even if there are no explicit explanations in the description.

Other Applicable Example

The application of the present invention is not restricted to the device for the above-mentioned robot controller. The present invention also has application to machine tools, semiconductor manufacturing equipment, other industrial machines, FA (Factory Automation), controllers and control instruments for automated machines.

INDUSTRIAL APPLICABILITY

The present invention is of use to a handheld device and a holder.

DESCRIPTION OF REFERENCE NUMERALS

1: device (handheld device)
2: tablet (body)
3: grip part
30: bottom portion
4: holder part (holder)
44, 45: engagement portion
47: emergency stop switch (operation input part)
$47_1$: pulse generator unit (operation input part)
$47_2$: switch unit (operation input part)
$47_3$: joystick (operation input part)
47C: clip member (attaching portion)
$O_1$: center of device
$O_2$: center of grip part
RC: robot controller (external equipment)

The invention claimed is:

1. A tablet holder for detachably attaching a tablet for controlling a machine, said tablet holder comprising:
 a holder body including a support surface adapted to support said tablet on a frontside of said holder body;
 an engagement portion provided at said holder body and adapted to detachably engage with said tablet that is supported at said support surface of said holder body; and
 a rotatable grasp portion that is provided on a backside of said holder body, that extends longitudinally along a backside surface of said holder body, and that is configured and adapted for an operator of said tablet to grasp from below by a palm of a hand of the operator to support said tablet and said holder body,
 wherein said engagement portion comprises a pair of engagement members that are movable toward and away from one another, and in an attachment state in which said tablet is supported at said support surface of said holder body and engaged with said pair of engagement members, said pair of engagement members are disposed above a front surface of said tablet to sandwich said tablet between said pair of engagement members and said support surface of said holder body,
 wherein said grasp portion comprises an upper part that includes a planar surface rotatably supported at said backside surface of said holder body and that extends longitudinally forwardly beyond said planar surface along said backside surface of said holder body in such a way as to form a clearance between a longitudinal forward end of said upper part and said backside surface of said holder body to prevent a finger of the operator from being caught between said longitudinal forward end of said upper part and said backside surface of said holder body, a lower part that is disposed below said upper part, that extends longitudinally forwardly along said backside surface of said holder body, that includes a planar surface located downwardly away from said upper part and disposed opposite said planar surface of said upper part, and that is configured and adapted to be supported from below by the palm of the operator and a side part that is disposed between said upper part and said lower part, that extends longitudinally forwardly to connect respective circumferential surfaces of said upper part and said lower part, and that is configured and adapted to be grasped by fingers of the operator when supporting said lower part from below by the palm of the operator, wherein a grasping length defined by a longitudinal length of said longitudinally extending upper part of said grasp portion is longer than a grasping thickness defined by an up-down length formed of said longitudinally extending upper, lower and side parts of said grasp portion, wherein a push button of an enable switch having a contact is provided at and projecting from said side part of said grasp portion, configured and adapted to be operatable by a finger of the operator during grasping said side part, wherein said enable switch is a switch in which when said push button is lightly pressed, said contact turns ON and said enable switch outputs a signal to said machine to enable a teaching work to be performed, when said push button is not pressed, a signal output to said machine is stopped, and when said push button is strongly pressed from a lightly pressed state, said contact turns OFF and said enable switch stops outputting said signal to said machine, and wherein said enable switch is rotatable along with a rotation of said grasp portion, whereby even when said grasp portion is grasped by a right hand or a left hand of the operator, said push button of said enable switch is pushable by a predetermined finger of the operator;

wherein the upper part of the grasp portion curves toward the holder body in a direction from the planar surface of the upper part toward the longitudinal forward end of the upper part, in order to form the clearance.

2. The tablet holder according to claim 1, wherein said grasp portion is configured and adapted to be connected to an end of a cable for outputting said signal from said enable switch to said machine.

3. The tablet holder according to claim 1, wherein said pair of engagement members are adapted to hold a pair of corner portions disposed at diagonal positions of said tablet.

4. The tablet holder according to claim 1, wherein said pair of engagement members are respectively formed of a pair of arm portions extending arcuately and said pair of arm portions are respectively swingably supported at respective distal ends of a pair of slide bases that are slidable at said holder body.

5. The tablet holder according to claim 4, wherein said pair of arm portions are respectively formed of a pair of arm members spaced away from one another in an up-down direction, and wherein in an engagement state of said tablet, one of said pair of arm members is disposed on said front surface of said tablet and the other of said pair of arm members is disposed below a backside surface of said tablet.

6. The tablet holder according to claim 5, wherein a pair of spacer members are provided at end portions of said pair of arm members to interconnect said pair of arm members in the up-down direction, and wherein in said engagement state of said tablet, said pair of spacer members are in contact with adjacent respective side surfaces of corner portions of said tablet.

7. The tablet holder according to claim 6, wherein said pair of spacer members are adjustable in length.

8. The tablet holder according to claim 1, wherein there is provided a lock switch on the said backside of said holder body that locks a movement of said pair of engagement members in a direction away from one another.

9. The tablet holder according to claim 1, wherein either one of said pair of engagement members is provided with an emergency stop switch for stopping said machine in emergency.

10. The tablet holder according to claim 1, wherein said grasp portion is provided rotatable in a normal and reverse direction relative to said holder body through a ratchet mechanism.

* * * * *